United States Patent
Mashimo

(10) Patent No.: US 8,212,780 B2
(45) Date of Patent: Jul. 3, 2012

(54) APPARATUS AND PROGRAM FOR CONTROLLING THE STATE OF AN OBJECT DISPLAYED ON A SCREEN BY OPERATING A TOUCH PANEL

(75) Inventor: Masahiko Mashimo, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 982 days.

(21) Appl. No.: 11/223,929

(22) Filed: Sep. 13, 2005

(65) Prior Publication Data

US 2006/0077185 A1   Apr. 13, 2006

(30) Foreign Application Priority Data

Oct. 7, 2004   (JP) ................................ 2004-295392

(51) Int. Cl.
*G06F 3/041* (2006.01)
(52) U.S. Cl. .................................................... 345/173
(58) Field of Classification Search .............. 345/145, 345/146, 156, 173, 123, 805; 273/434; 715/781, 715/744, 798, 810, 974, 964, 769, 794, 800, 715/863; 395/159
See application file for complete search history.

(56) References Cited

U.S. PATENT DOCUMENTS

| | | | | |
|---|---|---|---|---|
| 5,411,270 | A * | 5/1995 | Naka et al. | 463/33 |
| 5,452,413 | A * | 9/1995 | Blades | 715/786 |
| 5,655,094 | A * | 8/1997 | Cline et al. | 715/786 |
| 5,694,150 | A * | 12/1997 | Sigona et al. | 715/856 |
| 5,864,330 | A * | 1/1999 | Haynes | 715/856 |
| 6,377,281 | B1 * | 4/2002 | Rosenbluth et al. | 715/700 |
| 7,022,014 | B2 | 4/2006 | Namba et al. | |
| 2004/0165010 | A1 * | 8/2004 | Robertson et al. | 345/805 |
| 2004/0212586 | A1 * | 10/2004 | Denny, III | 345/156 |
| 2005/0143174 | A1 * | 6/2005 | Goldman et al. | 463/42 |
| 2005/0183041 | A1 * | 8/2005 | Chiu et al. | 715/850 |

FOREIGN PATENT DOCUMENTS

| | | |
|---|---|---|
| JP | 03-083118 | 4/1991 |
| JP | 06-285259 | 10/1994 |
| JP | 09-190186 | 7/1997 |
| JP | 2002-000939 | 1/2002 |
| JP | 2002-224441 | 8/2002 |

OTHER PUBLICATIONS

Office Action dated Dec. 25, 2009 issued in corresponding Japanese Application No. 2004-295392.
"Exhaustive Verification Part 2: Proposal for Never Experienced Game! Nintendo DS (Provisional Name)", the Jun. 11 issue of Shukan Famitsu, Enterbrain, Inc., Jun. 11, 2004, the 19th volume, the 24th issue, pp. 16-17.

* cited by examiner

*Primary Examiner* — Chanh Nguyen
*Assistant Examiner* — Sanghyuk Park
(74) *Attorney, Agent, or Firm* — Nixon & Vanderhye P.C.

(57) ABSTRACT

The present invention relates to a game apparatus for changing a display state of an image by displaying a marker on a display screen covered with a touch panel and moving the marker while pressing the marker. The game apparatus divides the touch panel into a plurality of areas, detects the coordinate value of the marker on the display screen covered with the touch panel, and continuously changes the display state of the image based on the parameter set for the area in which the marker is located, in accordance with the movement of the marker.

29 Claims, 21 Drawing Sheets

FIG. 7

| COLUMN NUMBER Y | SIZE OF THE DISPLAYED OBJECT |
|---|---|
| Y1 | 1.6 |
| Y2 | 1.4 |
| Y3 | 1.2 |
| Y4 | 1.0 |
| Y5 | 0.8 |
| Y6 | 0.6 |
| Y7 | 0.4 |

FIG. 8

| ROW NUMBER X | LENGTH IN THE VERTICAL DIRECTION | LENGTH IN THE HORIZONTAL DIRECTION |
|---|---|---|
| X1 | 0.4 | 1.6 |
| X2 | 0.6 | 1.4 |
| X3 | 0.8 | 1.2 |
| X4 | 1.0 | 1.0 |
| X5 | 1.2 | 0.8 |
| X6 | 1.4 | 0.6 |
| X7 | 1.6 | 0.4 |

FIG. 15

| COLUMN NUMBER Y | ACCELERATION (km/h/s) |
|---|---|
| Y1 | +6 |
| Y2 | +4 |
| Y3 | +2 |
| Y4 | 0 |
| Y5 | −2 |
| Y6 | −4 |
| Y7 | −6 |

54

| COLUMN NUMBER X | MOVING AMOUNT (X COORDINATE VALUE/t) |
|---|---|
| X1 | +15 |
| X2 | +10 |
| X3 | +5 |
| X4 | 0 |
| X5 | −5 |
| X6 | −10 |
| X7 | −15 |

55

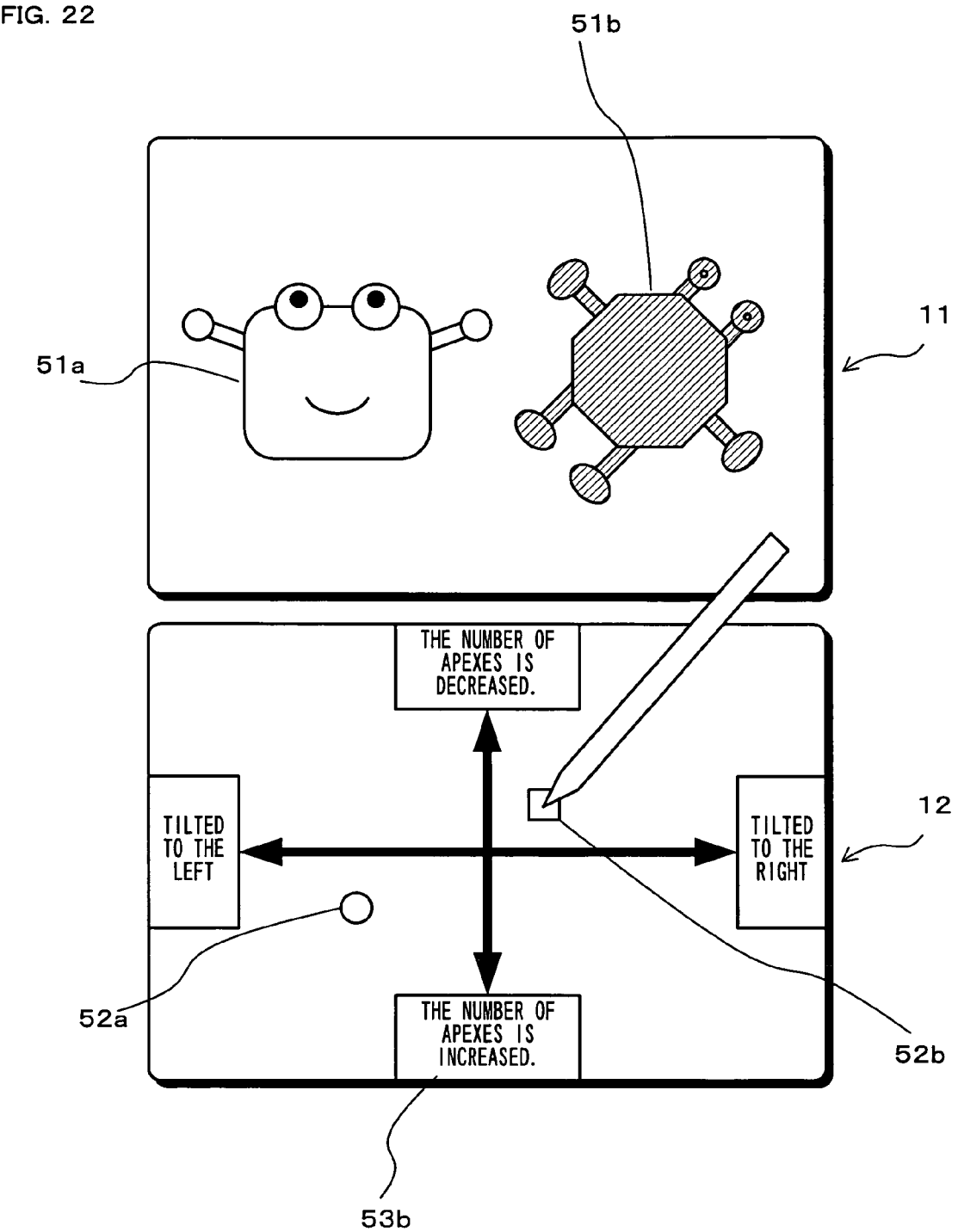

US 8,212,780 B2

APPARATUS AND PROGRAM FOR CONTROLLING THE STATE OF AN OBJECT DISPLAYED ON A SCREEN BY OPERATING A TOUCH PANEL

BACKGROUND

1. Field

The Example embodiments of the present invention relate to a game apparatus and a game program, and more specifically to a game apparatus and a game program for controlling the display state of an object displayed on a screen by operating a touch panel.

2. Description of the Background Art

According to one conventionally disclosed technology for operating an apparatus by directly touching an operation panel (touch input operation), a sound is output such that the musical scale of the sound is changed along a coordinate value X on a tablet and the volume of the sound is changed along a coordinate value Y of the tablet (for example, Japanese Laid-Open Patent Publication No. 3-83118). According to another such technology, a touch position on the touch panel is detected, and a sound height assigned to the key drawn at the touch position is generated. In accordance with the movement of the touch position on the touch panel, the moving distance is calculated. A sound of the height, which is changed in accordance with the calculated moving distance, is generated. (See, for example, Japanese Laid-Open Patent Publication No. 9-190186.)

However, the conventional technologies are for changing the type of sound to be output based on the coordinate position to be touched, and is not for changing the state of the image already displayed. In addition, in the case where the touch position on the touch panel is detected by the conventional technology in order to change the image instead of the sound, when the player touches a predetermined position on the touch panel, a predetermined image is displayed. When the player removes his/her finger from the touch panel and then touches another position far from the previous touch position, an image which is not related at all to the previous image may be displayed. In this case, continuously changing images cannot be presented to the player.

SUMMARY

Therefore, one aspect of example embodiments of the present invention is to provide a game apparatus and a game program capable of presenting the player with continuously changing images in response to an input operation performed by the player.

Example embodiments of present invention have the following features to attain the aspect mentioned above. The reference numerals, additional explanations and the like in parentheses in this section of the specification indicate the correspondence with the embodiments described later for easier understanding of example embodiments of the present invention and do not limit the present invention in any way.

A first aspect of example embodiments of the present invention is directed to a game apparatus comprising a touch panel (16), area information setting means (31, 21*a*), marker display position storage means (25), display means (11, 12), marker distinguishing means (31, 21*d*), marker display position changing means (31, 21*e*), area distinguishing means (31, 21*b*), and object changing means (31, 21*c*). The touch panel detects operation information which indicates an operation performed by the player. The area information setting means divides the touch panel into a plurality of areas (FIG. 6) and sets different area information for each of the plurality of areas regarding a display state of an object (FIG. 7, FIG. 8 and FIG. 10). The marker display position storage means stores a display position of a marker for representing one of the plurality of areas. The display means is provided in relation with the touch panel and displays a game image including the object (51) operable by the player and the marker (52). The marker distinguishing means compares coordinate data obtained from the operation information with a coordinate value of the display position of the marker and thus distinguishes whether or not the player indicates the marker. When it is distinguished by the marker distinguishing means that the player indicates the marker, the marker display position changing means changes the display position of the marker in accordance with a change in the operation information. The area distinguishing means distinguishes an area corresponding to the display position of the marker based on the display position. When the display position of the marker is changed by the marker display position changing means, the object changing means changes the display state of the object based on the area information which is set for the area corresponding to the display position of the marker and distinguished by the area distinguishing means.

In a second aspect of example embodiments of the present invention based on the first aspect, the area information setting means divides the touch panel into first areas along a first direction and divides the touch panel into second areas along a second direction perpendicular to the first direction, and sets a first parameter (54) changing step by step along the first direction and a second parameter (55) changing step by step along the second direction and being different from the first parameter, for each of the plurality of areas as the area information. The object changing means changes the display state of the object based on the first parameter and the second parameter which are set for the distinguished area.

In a third aspect of example embodiments of the present invention based on the first aspect, the display means includes a first display section (11) and a second display section (12). The game image including the object is displayed on the first display section, and an image (53) indicating a content of the area information which is set for each of the plurality of areas and the marker are displayed on the second display section. The touch panel is provided in relation with the second display section.

In a fourth aspect of example embodiments of the present invention based on the first aspect, the game apparatus further comprises object image storage means (22*a*) for storing an object image associated with each of the plurality of areas as the area information. The object changing means reads the object image associated with the distinguished area from the object image storage means and displays the object image on the display means.

In a fifth aspect of example embodiments of the present invention based on the first aspect, the display means displays a plurality of markers and a plurality of objects respectively associated with the plurality of markers. The marker distinguishing means specifies which one of the plurality of markers is indicated based on the operation information and the coordinate values of the display positions of the markers. The object changing means changes the display state of the object associated with the marker specified by the marker distinguishing means.

In a sixth aspect of example embodiments of the present invention based on the fifth aspect, the object changing means changes the display state of the object associated with the marker specified by the marker distinguishing means, and changes an image indicating a content of the area information.

A seventh aspect of example embodiments of the present invention is directed to a game apparatus comprising first display means (11), second display means (12), a touch panel (16), area information setting means (31, 21*a*), area distinguishing means (31, 21*b*), and object changing means (31, 21*c*). The first display means displays a game image including an object operable by the player. The second display means displays an image indicating a content of area information which is set for each of a plurality of areas. The touch panel is provided in relation with the second display means and detects operation information. The area information setting means divides the touch panel into the plurality of areas and sets different area information for each of the plurality of areas. The area distinguishing means distinguishes an area indicated by the player based on the operation information detected by an operation on the touch panel by the player. The object changing means changes a display state of the object based on the area information which is set for the area distinguished by the area distinguishing means.

The above-described aspects of example embodiments of the invention may be provided in the form of a storage medium storing a game program to be performed by a computer of the game apparatus. Namely, the first through seventh aspects of example embodiments of the present invention may be in the form provided to the game apparatus by a storage medium storing the game program.

According to the first aspect of example embodiments of the present invention, the display state of the object can be changed based on the area information which is set for the area on the display means in which the marker is located. Therefore, by moving the marker displayed on the screen while pressing the marker, the display state of the object can be changed step by step and continuously in accordance with the movement of the marker. This allows the player to change the display state of the object step by step and continuously by operating the marker.

According to the second aspect of example embodiments of the present invention, by using two types of parameters in combination as the area information, the display state of the object can be changed. Therefore, two types of changes of the display state can be provided by one touch panel operation. This widens the variation of the change of the display state of the object.

According to the third aspect of example embodiments of the present invention, an image representing the content of the area information which is set for each of the plurality of areas can be displayed together with the marker. Therefore, the correspondence between the position on the touch panel indicated by the player and the change of the display state of the object can be presented to the player. This allows the player to easily understand how the object is changed in accordance with the movement of the marker.

According to the fourth aspect of example embodiments of the present invention, an object image associated with each of the divided areas can be stored and displayed. This allows the display state of the object to be changed variously, which cannot be realized by image display by calculations.

According to the fifth aspect of example embodiments of the present invention, in the case where a plurality of objects and a plurality of markers are displayed, the marker indicated by the player can be specified. Therefore, the display state of the object corresponding to the marker indicated by the player can be changed; for example, the color of such an object can be changed to a predetermined color.

According to the sixth aspect of example embodiments of the present invention, an image indicating the content of the area information can be changed to an image corresponding to the marker indicated by the player. This allows different parameters to be set for a plurality of objects provided as operation targets.

According to the seventh aspect of example embodiments of the present invention, by moving the marker displayed on the screen while pressing the marker, the display state of the object can be continuously changed in accordance with the movement of the marker. In addition, an image indicating the content of the parameter which is set for each of the plurality of areas can be displayed together with the marker. This allows the player to easily understand how the object is changed in accordance with the movement of the marker.

These and other features, aspects and advantages of example embodiments of the present invention will become more apparent from the following detailed description of the present invention when taken in conjunction with the accompanying drawings.

BRIEF DESCRIPTION OF THE DRAWINGS

FIG. 7 shows an example of a parameter table 54;

FIG. 8 shows an example of a parameter table 55;

FIG. 15 shows an example of parameter tables when an example embodiment of the present invention is applied to the racing game;

FIG. 21 shows an example of the LCD 12 displaying a parameter changing guide 53a corresponding to a marker 52a; and FIG. 22 shows an example of the LCD 12 displaying a parameter changing guide 53b corresponding to a marker 52b.

DESCRIPTION OF THE EXAMPLE EMBODIMENTS

Hereinafter, the present invention will be described by way of example embodiments with reference to the drawings. The following example embodiments do not limit the present invention in any way.

(First Embodiment)

Figure 1:
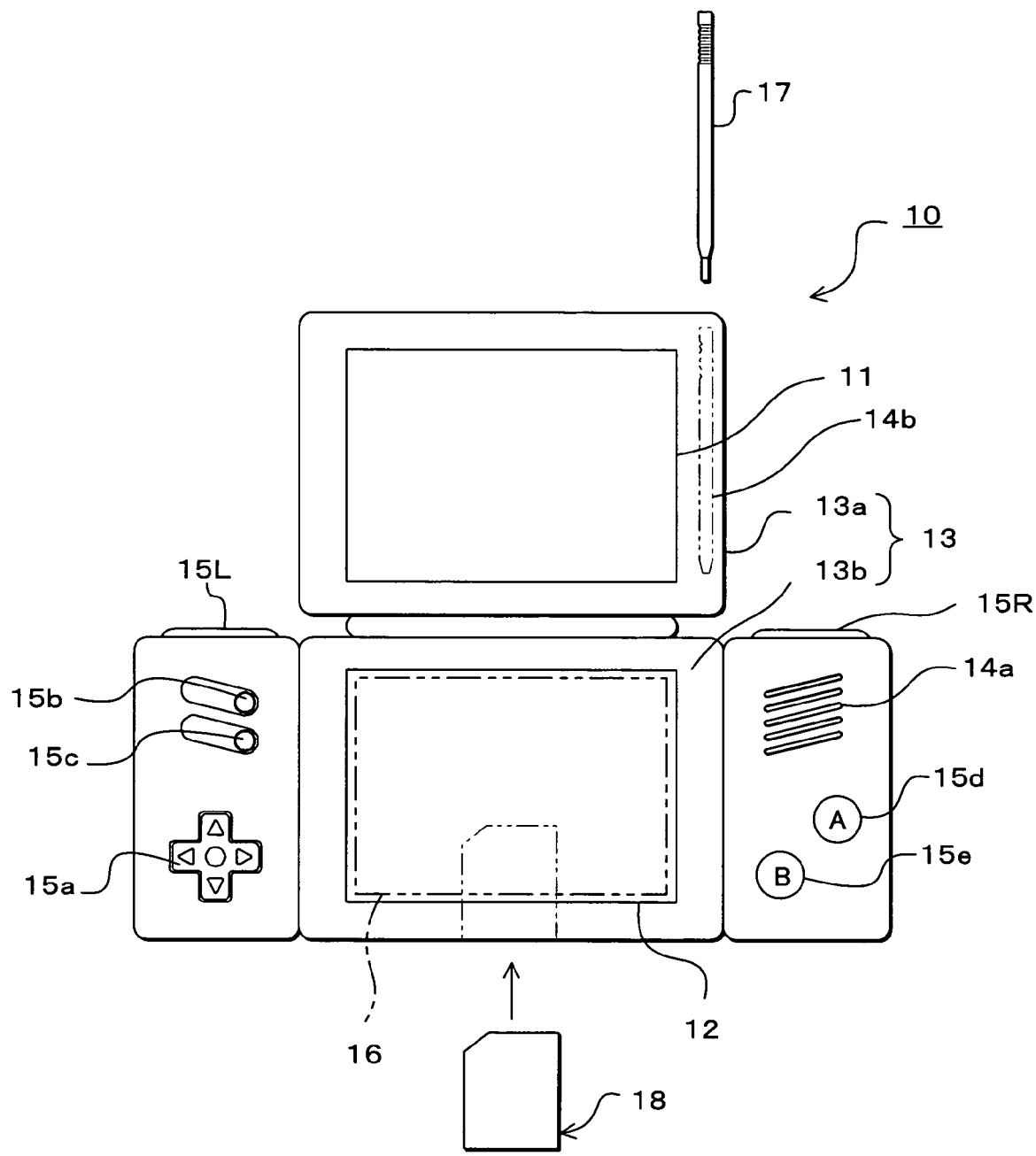
FIG. 1 is an external view of a mobile game apparatus 10 according to a first example embodiment of the present invention.

FIG. 1 is an external view of a mobile game apparatus 10 according to a first example embodiment of the present invention. In FIG. 1, the game apparatus 10 in this embodiment includes two liquid crystal displays (hereinafter, referred to as "LCDs") 11 and 12 which are accommodated in a housing 13 at predetermined positions. Specifically, in the case where the LCD 11 (first LCD) and the LCD 12 (second LCD) are accommodated in a vertically stacking manner, the housing 13 includes an upper housing 13a and a lower housing 13b. The upper housing 13a is pivotably supported by a part of an upper surface of the lower housing 13b. The upper housing 13a has a planar shape slightly larger than a planar shape of the first LCD 11, and has an opening for exposing a display screen of the first LCD 11 on one main surface thereof. The lower housing 13b has a planar shape longer in the horizontal direction than the planar shape of the upper housing 13a, and has an opening for exposing a display screen of the second LCD 12 at approximately the center of the lower housing 13b in the horizontal direction. One of two side sections of the lower housing 13b interposing the second LCD 12 has speaker holes 14a, and each of the two side sections has an operation switch section 15.

The operation switch section 15 includes a direction instruction switch 15a, a start switch 15b, and a select switch 15c which are attached to one main surface of the side section of the lower housing 13b to the left of the second LCD 12 as seen in FIG. 1. The operation switch section 15 also includes motion switches 15d and 15e which are attached to one main surface of the side section of the lower housing 13b to the right of the second LCD 12 as seen in FIG. 1. The direction instruction switch 15a is used, for example, for instructing a moving direction of a player object (or a player character) operable by the player or for instructing a moving direction of a cursor. The motion switches 15d and 15e are used for inputting motions other than the instructions on directions, for example, for inputting an instruction to jump, punch, move a weapon, etc. in an action game, and for inputting an instruction to obtain an item or to select and determine a weapon or a command, etc. in a roll playing game (RPG) or a simulation RPG. When necessary, the lower housing 13b may further include an additional operation switch(es), or side surface switches 15L and 15R which are respectively provided on upper surfaces of the side sections of the lower housing 13b to the left and to the right of the second LCD 12.

On a front surface of the second LCD 12, a touch panel 16 is provided. The touch panel 16 is of, for example, any of a resistance film system, an optical (infrared) system, and a static capacitance coupling system. When a stick 17 (or a finger) presses, moves on, or touches an upper surface of the touch panel 16, the coordinate position of the stick 17 is detected and the coordinate data is output.

In the vicinity of a side surface of the upper housing 13a, an accommodation hole 14b is formed when necessary for accommodating the stick 17 for operating the touch panel 16. The stick 17 is accommodated in the accommodation hole 14b. In a part of one side surface of the lower housing 13b, a cartridge insertion section (represented by the thin two-dot chain line in FIG. 1) is formed, for detachably accepting a memory card 18 having a built-in memory (e.g., a ROM) which stores a game program. A part of the lower housing 13b inner to the cartridge insertion section has a built-in connecter (represented by reference numeral 33 in FIG. 2) to be electrically connected with the memory card 18. The lower housing 13b (or the upper housing 13a) accommodates an electronic circuit board (represented by reference numeral 30 in FIG. 2) having various electronic components such as a CPU and the like mounted thereon. The information storage medium for storing the game program is not limited to a nonvolatile semiconductor memory such as a ROM or a flash memory, and may be a CD-ROM, a DVD, or a similar optical disc-shaped storage medium.

Figure 2:
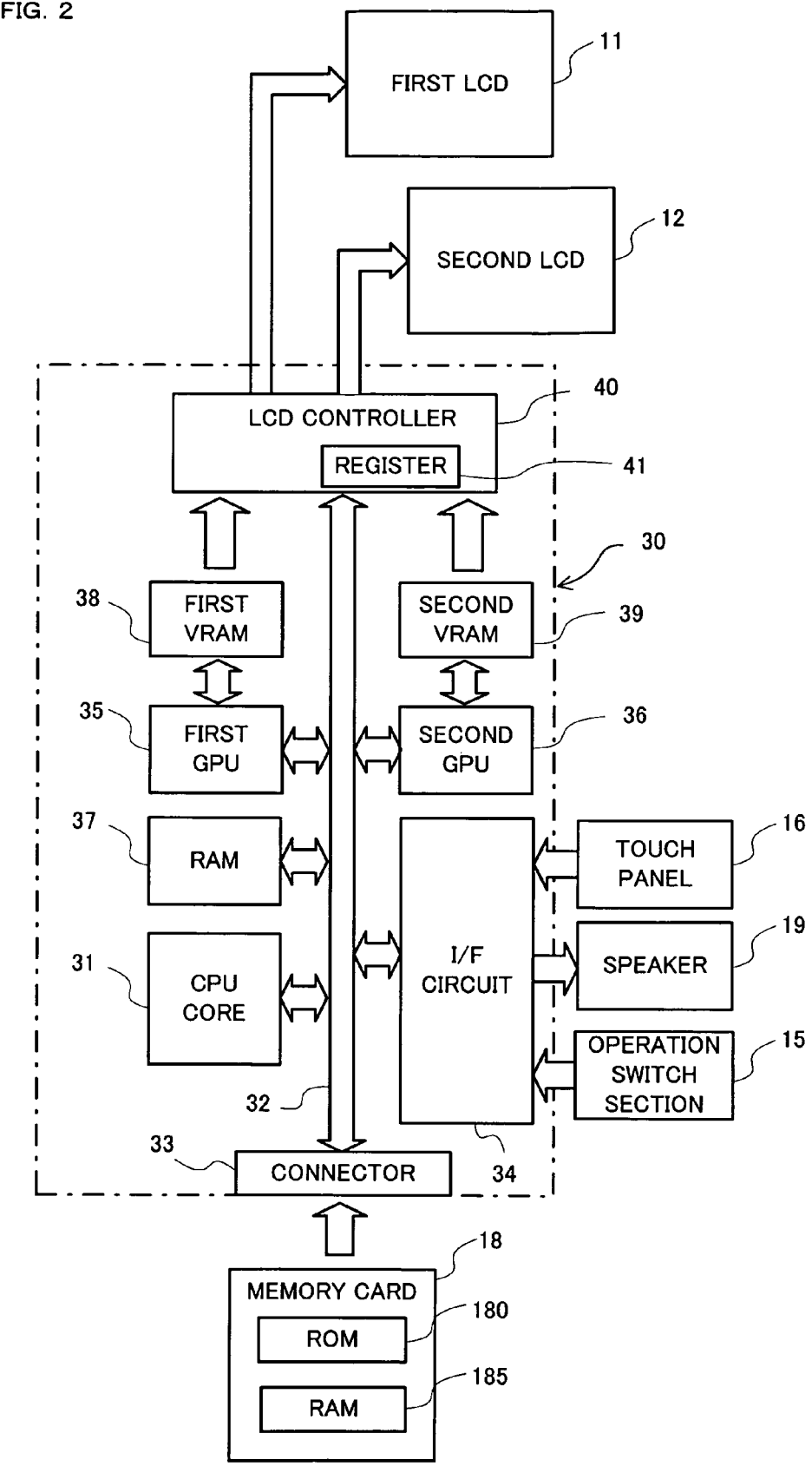
FIG. 2 is a block diagram of the mobile game apparatus 10 according to the first example embodiment of the present invention.

FIG. 2 is a block diagram of the mobile game apparatus 10. In FIG. 2, the electronic circuit board 30 accommodated in the housing 13 has a CPU core 31 mounted thereon. The CPU core 31 is connected to the connecter 33, an input/output interface (I/F) circuit 34, a first graphic processing unit (first GPU) 35, a second graphic processing unit (second GPU) 36, a RAM 37, and an LCD controller 40 via a bus 32. To the connecter 33, the memory card 18 is detachably connectable. As described above, the memory card 18 is a storage medium for storing a game program. Specifically, the memory card 18 has a ROM 180 for storing the game program and a RAM 185 for rewritably storing backup data mounted thereon. The game program stored on the ROM 180 in the memory card 18 is loaded on the RAM 37, and the game program loaded on the RAM 37 is executed by the CPU core 31. Temporary data and data for generating an image, which can be obtained by the CPU core 31 through execution of the game program, are stored on the RAM 37. The I/F circuit 34 is connected to the operation switch section 15, the touch panel 16, and a speaker 19. The speaker 19 is located at a position inside the speaker holes 14a described above.

The first GPU 35 is connected to a first video RAM (hereinafter, referred to as the "first VRAM") 38, and the second GPU 36 is connected to a second video RAM (hereinafter, referred to as the "second VRAM") 39. In accordance with an instruction from the CPU core 31, the first GPU 35 generates a first game image based on data for generating an image stored on the RAM 37, and draws the generated first game image on the first VRAM 38. In accordance with an instruction from the CPU core 31, the second GPU 36 generates a second game image based on data for generating an image stored on the RAM 37, and draws the generated second game image on the second VRAM 39. The first VRAM 38 and the second VRAM 39 are connected to the LCD controller 40.

The LCD controller 40 includes a register 41. The register 41 stores the value of 0 or 1 in accordance with an instruction from the CPU core 31. When the value of the register 41 is 0, the LCD controller 40 outputs the game image drawn on the first VRAM 38 to the first LCD 11 and outputs the game image drawn on the second VRAM 39 to the second LCD 12. When the value of the register 41 is 1, the LCD controller 40 outputs the game image drawn on the first VRAM 38 to the second LCD 12 and outputs the game image drawn on the second VRAM 39 to the first LCD 11.

The I/F circuit 34 passes data between external input and output devices including the operation switch section 15, the touch panel 16 and the speaker 19, and the CPU core 31. The touch panel 16 (including a device driver for the touch panel) outputs data on a coordinate position corresponding to the position which is input (indicated) by the stick 17. In this embodiment, the resolution of the display screen is 256 dots× 192 dots, and the detection precision of the touch panel 16 is also 256 dots×192 dots in correspondence with the resolution of the display screen. The detection precision of the touch panel 16 may be lower or higher than the resolution of the display screen.

Figure 3:
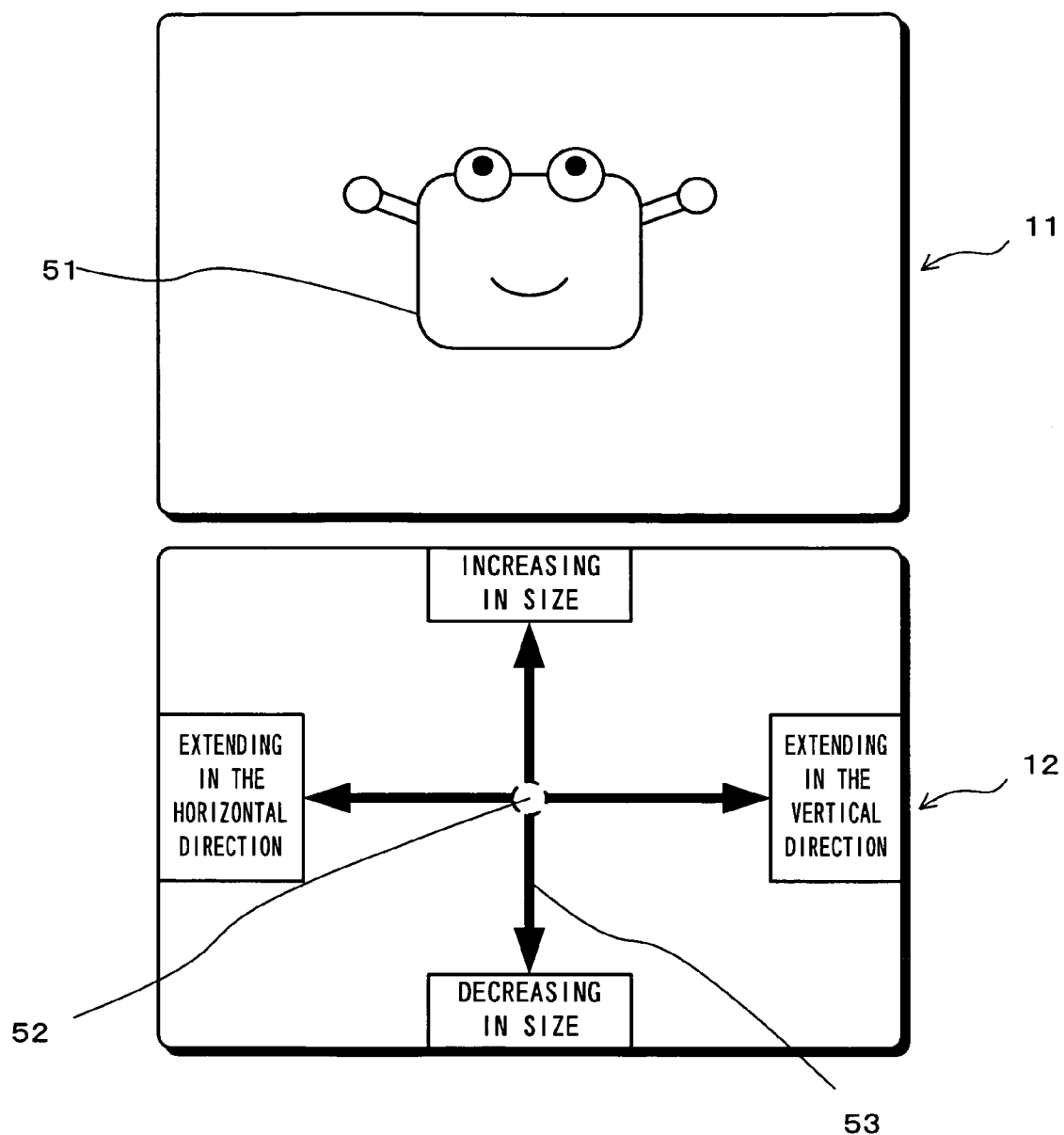
FIG. 3 shows an example of a game screen assumed in the first example embodiment of the present invention.
Figure 4:
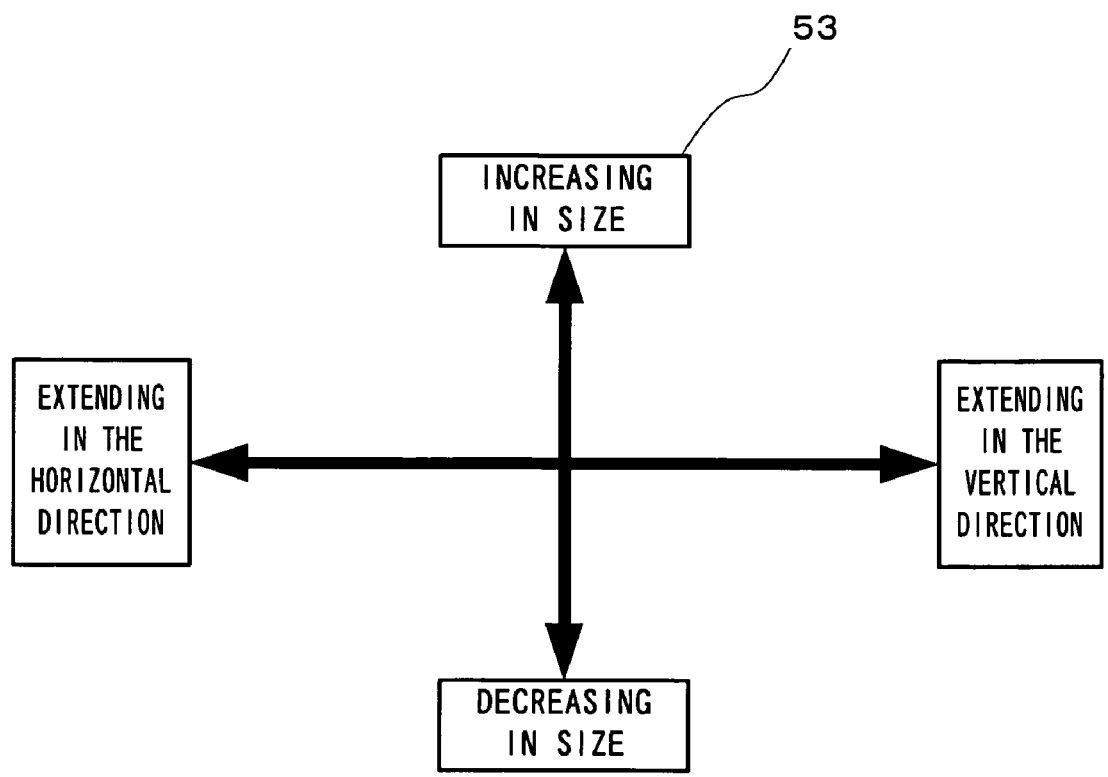
FIG. 4 shows an example of an image of a parameter changing guide 53.

With reference to FIG. 3, an overview of a game in this embodiment will be described. FIG. 3 shows an example of a game screen assumed in this embodiment. As shown in FIG. 3, an object 51 as an operation target (hereinafter, referred to as the "operation target object 51") is displayed on the LCD 11, and a marker 52 and a parameter changing guide 53 are displayed on the LCD 12. In this game, the display state of the operation target object 51 is changed to various states by moving the marker 52 while pressing the marker 52 on the screen by the stick 17 or the like. The parameter changing guide 53 is an image displayed to indicate to the player how the operation target object 51 is changed in accordance with the movement of the marker 52. For example, as shown in FIG. 4, a movement of the marker 52 along the vertical axis may indicate that the size of the object operation target 51 is changed, and a movement of the marker 52 along the horizontal axis may indicate that the length of the operation target object 51 in the vertical direction or the horizontal direction is changed.

Figure 5:
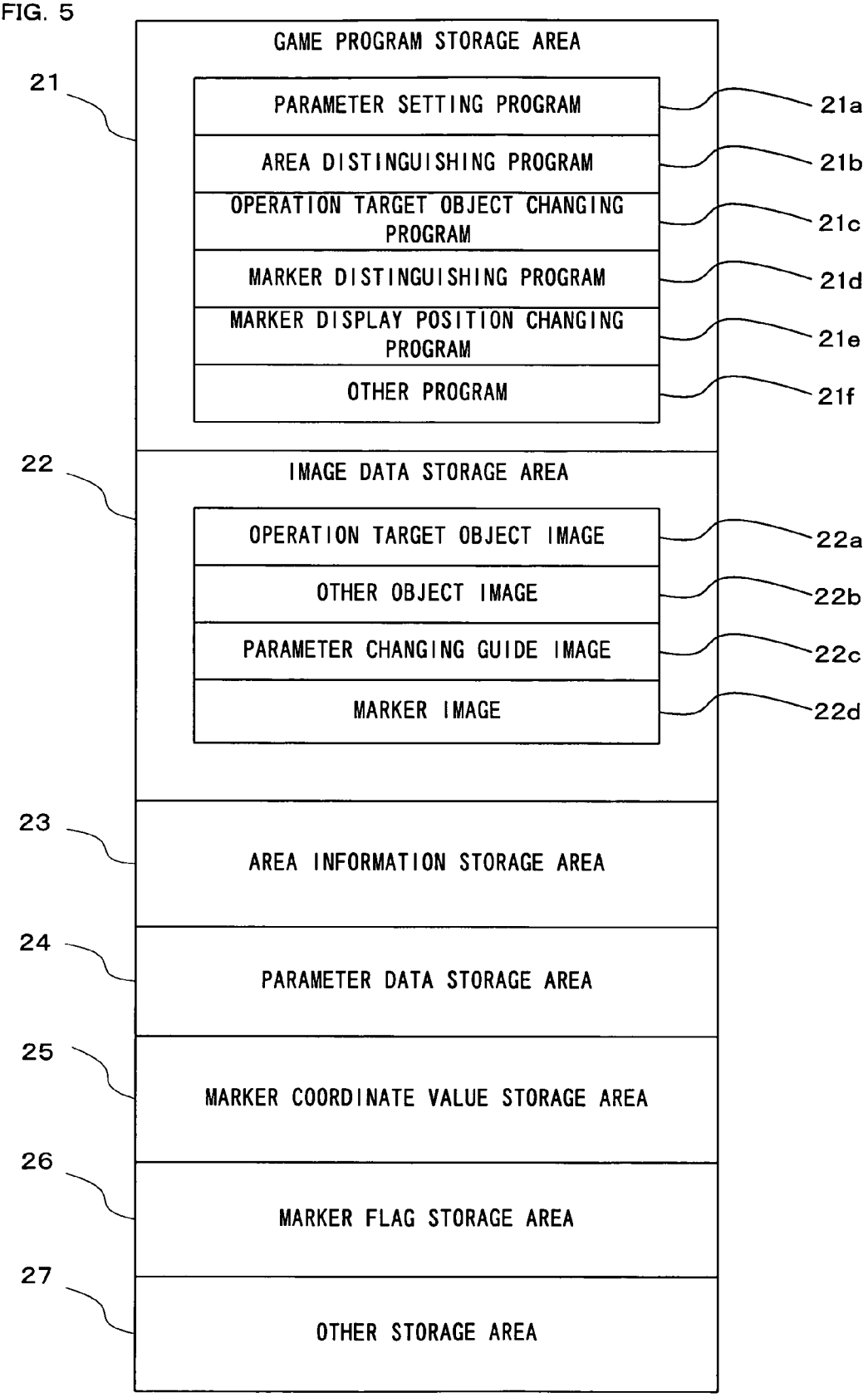
FIG. 5 is a memory map graphically illustrating a memory space of a RAM 37 shown in FIG. 2.

FIG. 5 is a memory map graphically illustrating a memory space of the RAM 37. As shown in FIG. 5, the RAM 37 includes, as storage areas, a game program storage area 21, an image data storage area 22, an area information storage area 23, a parameter data storage area 24, a marker coordinate value storage area 25, a marker flag storage area 26, and an other storage area 27.

In the game program storage area 21, programs necessary for performing image processing of the game or the like, game data in accordance with the game content, and the like are stored. More specifically, in the game program storage area 21, programs 21a through 21f which are operation programs of the CPU core 31 (programs for causing the CPU core 31 to execute the operations corresponding to the flowchart shown in FIG. 9 described later) are stored.

Figure 6:
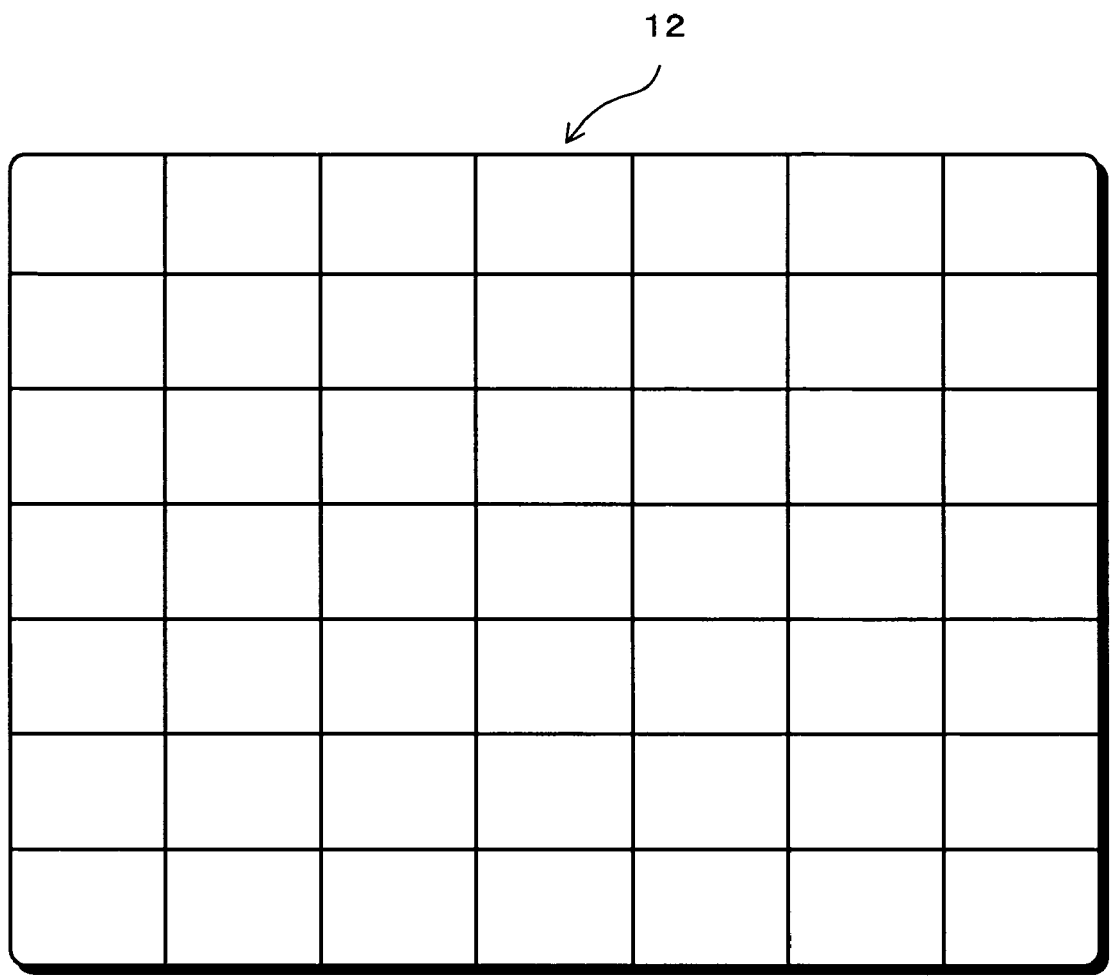
FIG. 6 shows an example of area division of an LCD 12.

As shown in FIG. 6, a parameter setting program 21a is a program for dividing the LCD 12 into a plurality of areas and setting a predetermined object parameter value in association with each of the plurality of areas. The "object parameter" is information for changing the display state of the operation target object 51 shown in FIG. 3.

An area distinguishing program 21b is a program for distinguishing the area, among the plurality of areas in the LCD 12 shown in FIG. 6, which corresponds to the display position of the marker 52 (see FIG. 3).

An operation target object changing program 21c is a program for changing the display state of the operation target object 51 based on the object parameter value.

A marker distinguishing program 21d is a program for, when the player has performed a touch operation, distinguishing whether or not the marker 52 displayed on the LCD 12 is pressed by the stick 17 (or a finger).

A marker display position changing program 21e is a program for changing the display position of the marker 52 on the LCD 12 in accordance with the operation by the player.

An other program 21f is a program for executing sound control processing for generating a sound effect or music, and processing performed when the game is over (for example, detecting the game-over state or storing backup data of the game state up to that point when the game is over).

In the image data storage area 22, image data 22a through 22d of images displayed on the LCD 11 and the LCD 12 are stored. An operation target object image 22a is image data of the operation target object 51 to be displayed on the LCD 11 and operated by the player. An other object image 22b is image data of a plurality of background (or still) objects and the like. A parameter changing guide image 22c is image data of the parameter changing guide 53 (see FIG. 4) for indicating how the operation target object 51 is changed. A marker image 22d is image data of the marker 52 displayed on the LCD 12.

In the area information storage area 23, area information, including information on the size and position of each of the plurality of areas of the LCD 12 divided by the parameter setting program 21a (see FIG. 6) and information associating each area and an object parameter, is stored.

In the parameter data storage area 24, object parameters associated with the respective areas of the LCD 12 divided by the parameter setting program 21a are stored. Specifically, for example, object parameters presented in the form of tables as shown in FIG. 7 and FIG. 8 are stored. In a parameter table 54 shown in FIG. 7, the sizes of the operation target object 51, changing step by step in correspondence with values of column number Y (Y1 through Y7), are set. More specifically, the sizes of the operation target object 51 corresponding to the column numbers of Y1 through Y3 and Y5 through Y7 are set where the size of the operation target object 51 is 1 when the column number is Y4. In a parameter table 55 shown in FIG. 8, the lengths of the operation target object 51 in the vertical direction and the horizontal direction, changing step by step in correspondence with values of row number X (X1 through X7), are set. More specifically, the lengths of the operation target object 51 in the vertical direction and the horizontal direction corresponding to the row numbers of X1 through X3 and X5 through X7 are set where the lengths of the operation target object 51 in the vertical direction and the horizontal direction are both 1 when the row number is X4.

In the marker coordinate value storage area 25, the current coordinate value of the marker 52 displayed on the LCD 12 is stored, and the current coordinate value is updated as necessary in accordance with the movement of the marker 52.

In the marker flag storage area 26, a marker flag, which is a flag for distinguishing whether the marker 52 is pressed or not, is stored. In this embodiment, when the marker flag is 0, the marker 52 is not pressed, whereas when the marker flag is 1, the marker 52 is pressed.

In the other storage area 27, data during the execution of the programs, various types of flags other than the marker flag, and the like are stored.

Figure 9:
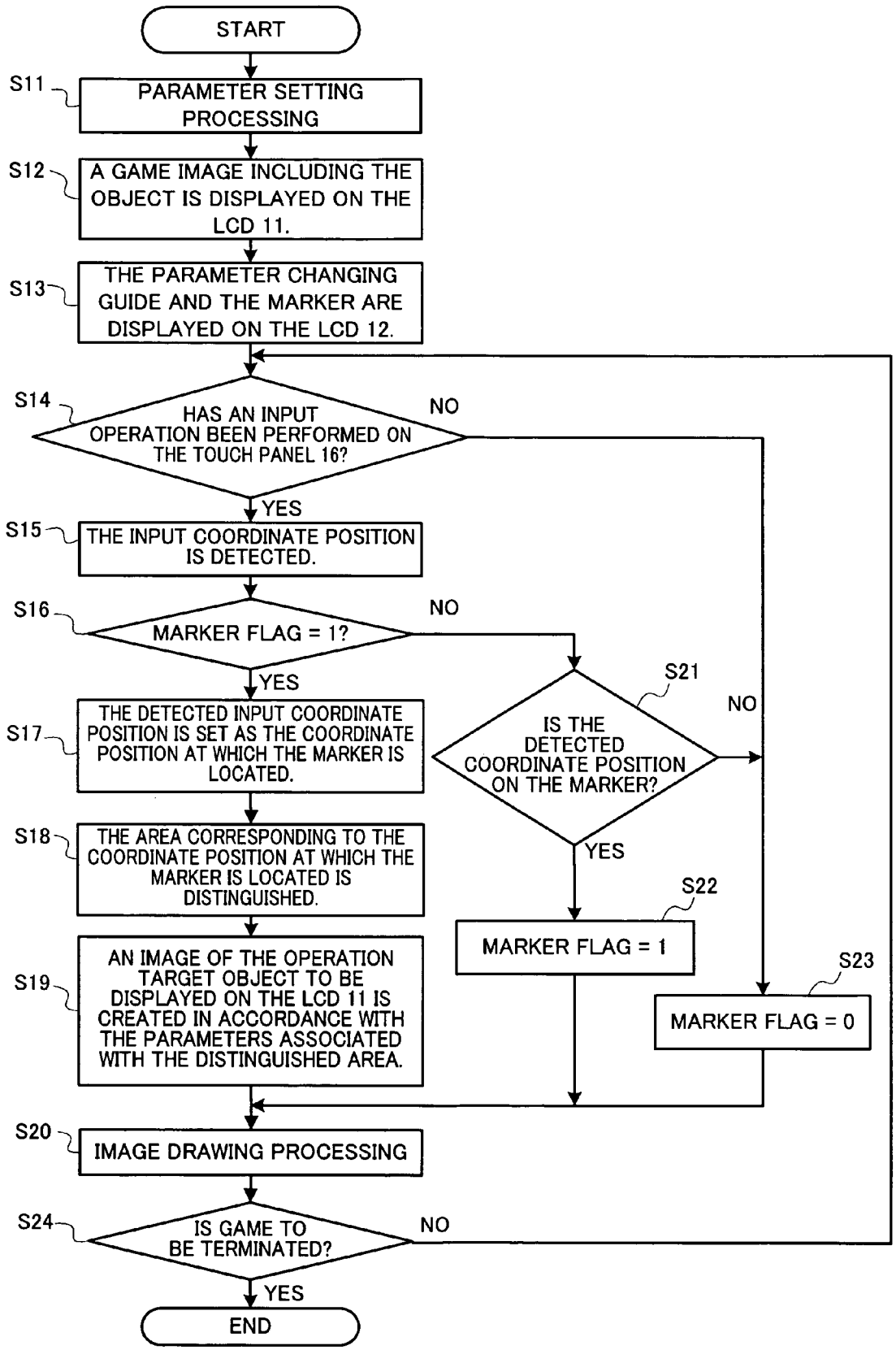
FIG. 9 is a flowchart of a main routine illustrating an overall operation of the mobile game apparatus 10 according to the first example embodiment of the present invention.

FIG. 9 is a flowchart illustrating a main routine, which shows an overall operation of the mobile game apparatus 10 shown in FIG. 1. Hereinafter, with reference to FIG. 9, the operation of the mobile game apparatus 10 in this embodiment will be described.

Figure 10:
FIG. 10 shows an example of setting the areas of the LCD 12 after parameter setting processing.

First in step S11, parameter setting processing for starting a game is performed. The parameter setting processing in step S11 will be described more specifically. First, the CPU core 31 reads area dividing information, which is information on a method for dividing the LCD 12 (for example, dividing the LCD 12 like a 7×7 graph paper where each area is 36 dots×27 dots), from the ROM 180, and stores the area dividing information in the other storage area 27. Next, the CPU core 31 reads the parameter tables 54 and 55 from the ROM 180 and stores the parameter tables 54 and 55 in the parameter data storage area 24. Then, the CPU core 31 divides the LCD 12 into a plurality of areas (see FIG. 6) based on the area dividing information. The CPU core 31 then sets the values of the row number X (X1 through X7) of the parameter table 55 and the values of the column number Y (Y1 through Y7) of the parameter table 54 in association with the respective areas of the LCD 12. FIG. 10 shows an example of the LCD 12 divided into a plurality of areas after the parameter setting processing. In FIG. 10, the LCD 12 is divided into 7 (in the vertical direction)×7 (in the horizontal direction) areas in a lattice-like manner. (Hereinafter, for easier description, the areas are labeled as A through G in the vertical direction (Y axis) and are labeled as 1 through 7 in the horizontal direction (X axis). The plurality of areas will be referred to based on this labeling. For example, the area at the upper left corner will be referred to as the "A1 area", and the area at the lower right corner will be referred to as the "G7 area".) The values of the row number are set as X1, X2, X3 . . . X7 from the left to right (in the horizontal direction in which the areas are labeled as 1 through 7), and the values of the column number are set as Y1, Y2, Y3 . . . Y7 from the top left to bottom (in the vertical direction in which the areas are labeled as A through G). For example, in the D3 area, X3 is set as the value of the row number X, and Y4 is set as the value of the column number Y. The CPU core 31 stores the information on the association of the divided areas and the parameters as shown in FIG. 10 in the area information storage area 23 as the area information. The CPU core 31 stores 0 in the marker flag storage area 26 (namely, the CPU core 31 sets the marker flag to be 0 as an initial value). The CPU core 31 further stores the coordinate value corresponding to, for example, the center of the LCD 12, in the marker coordinate value storage area 25 as the coordinate value of the initial display position of the marker 52. In this embodiment, the area dividing information and the parameter tables 54 and 55, which are stored on the ROM 180 in advance, are used. Alternatively, the area dividing information and the parameter table 54 and 55 may be created by the parameter setting program 21$a$ at the start of the game without being stored on the ROM 180, and may be changed as necessary as the game proceeds.

Next in step S12, image drawing processing on the LCD 11 is performed. More specifically, the operation target object 51 and other objects (for example, a background image) are read from the image data storage area 22 of the RAM 37 and displayed on the LCD 11.

Next in step S13, image drawing processing on the LCD 12 is performed. More specifically, the parameter changing guide 53 and the marker 52 are displayed on the LCD 12. As a result of the image drawing processing in steps S12 and S13, the operation target object 51 is displayed on the LCD 11 and the parameter changing guide 53 and the marker 52 are displayed on the LCD 12 as shown in FIG. 3.

Next in step S14, the CPU core 31 determines whether or not an input operation has been performed on the touch panel 16. When it is determined that there has been no input operation performed on the touch panel 16 (NO in step S14), the CPU core 31 sets the marker flag to be 0 (step S23). Then, the CPU core 31 performs image drawing processing for updating the display state of the LCD 11 and the LCD 12 (step S20). (Since there has been no input operation performed on the touch panel 16, the display state of the LCD 11 and the LCD 12 is not changed even though the display state is updated.)

The CPU core 31 then determines whether or not to terminate the game (step S24). By contrast, when it is determined that there has been an input operation performed on the touch panel 16 (YES in step S14), the CPU core 31 performs detection processing of the input coordinate position (step S15). In step S15, the CPU core 31 detects the coordinate value on the touch panel 16 of the LCD 12 which has been input. Next in step S16, the CPU core 31 determines whether the marker flag is 1 or not.

When it is determined that the marker flag is not 1 in step S16 (NO in step S16), the CPU core 31 determines whether or not the input coordinate value detected in step S15 is the same as the coordinate value stored in the marker coordinate value storage area 25 of the RAM 37 (namely, whether the player has pressed the marker 52 or not) (step S21). When it is determined that the input coordinate value is not the same as the coordinate value stored in the marker coordinate value storage area 25 (which means that the player has pressed a position on the touch panel 16 other than the marker 52) (NO in step S21), the CPU core 31 sets the marker flag to be 0 (step S23) and performs the image drawing processing (step S20). The CPU core 31 then determines whether or not to terminate the game (step S24). By contrast, when it is determined that the input coordinate value is the same as the coordinate value stored in the marker coordinate value storage area 25 (which means that the player has pressed the marker 52) (YES in step S21), the CPU core 31 sets the marker flag to be 1 (step S22) and performs the image drawing processing (step S20). In order to show that the marker 52 has been pressed, the CPU core 31 may draw an image on the LCD 12 after adding a display effect such as changing the color of the marker 52 to a predetermined color. The CPU core 31 then determines whether or not to terminate the game (step S24).

When it is determined in step S16 that the marker flag is 1 (which means that the player keeps on pressing the marker 52) (YES in step S16), the CPU core 31 advances to step S17 and stores the input coordinate value in the marker coordinate value storage area 25 (namely, the CPU core 31 updates the post-movement position of the marker 52 as the current coordinate value). Then in step S18, the CPU core 31 distinguishes the area on the LCD 12 where the marker 52 is located, based on the coordinate value of the marker 52 (i.e., the input coordinate value) and the area information (see FIG. 10). For example, in the area information as shown in FIG. 10, it is assumed that each area has a size of 36 dots×27 dots and the coordinate value at the lower left corner of the LCD 12 is set as (0, 0). When the coordinate value of the marker 52 is (10, 20), namely, the central point of the marker 52 is located at the 10th dot from the left end of the screen and the 20th dot from the bottom end of the screen in such area information, the CPU core 31 distinguishes that the area in which the marker 52 is located is the area G1.

Figure 11:
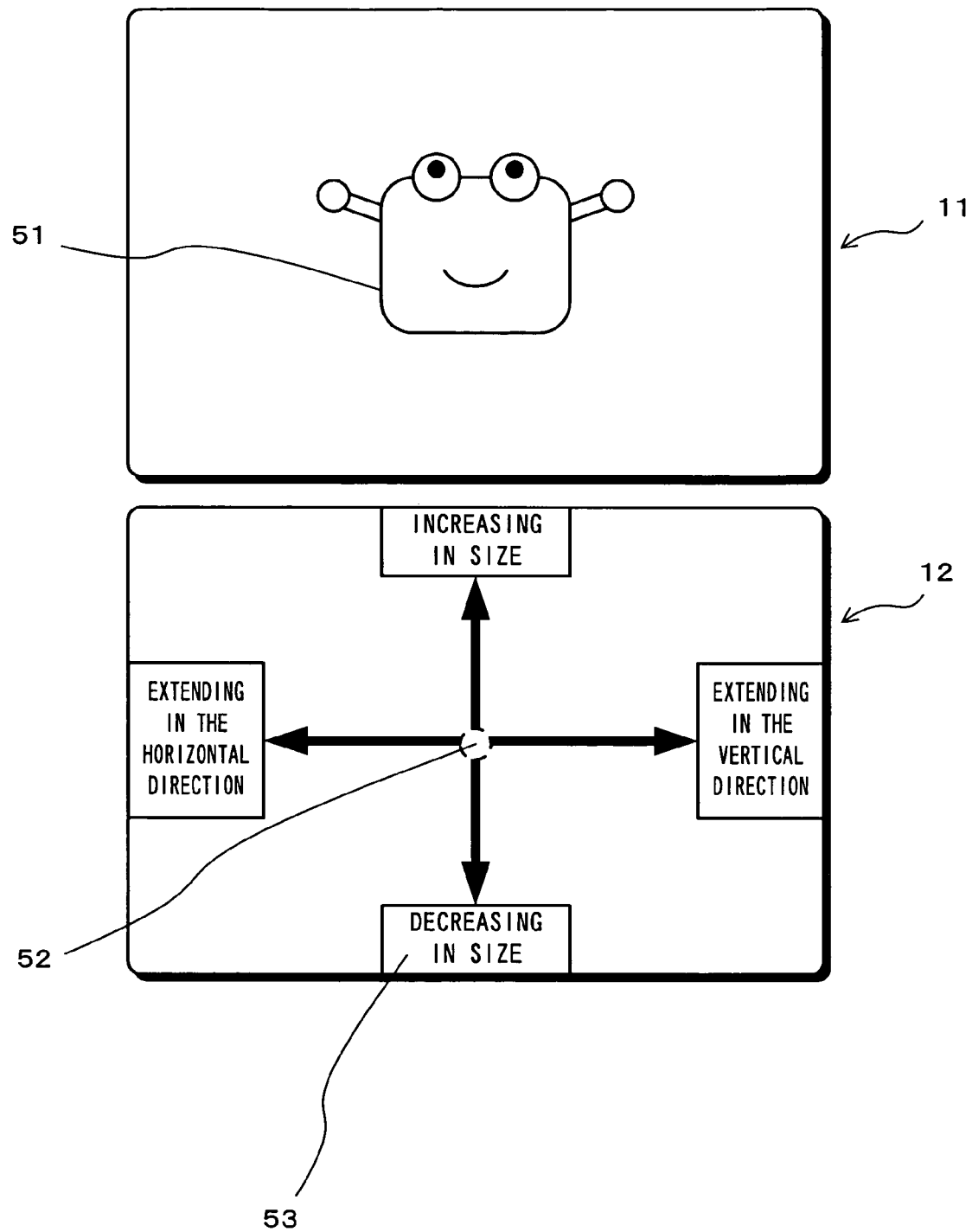
FIG. 11 shows an example of the display state of an LCD 11 and the LCD 12 before a marker is moved.
Figure 12:
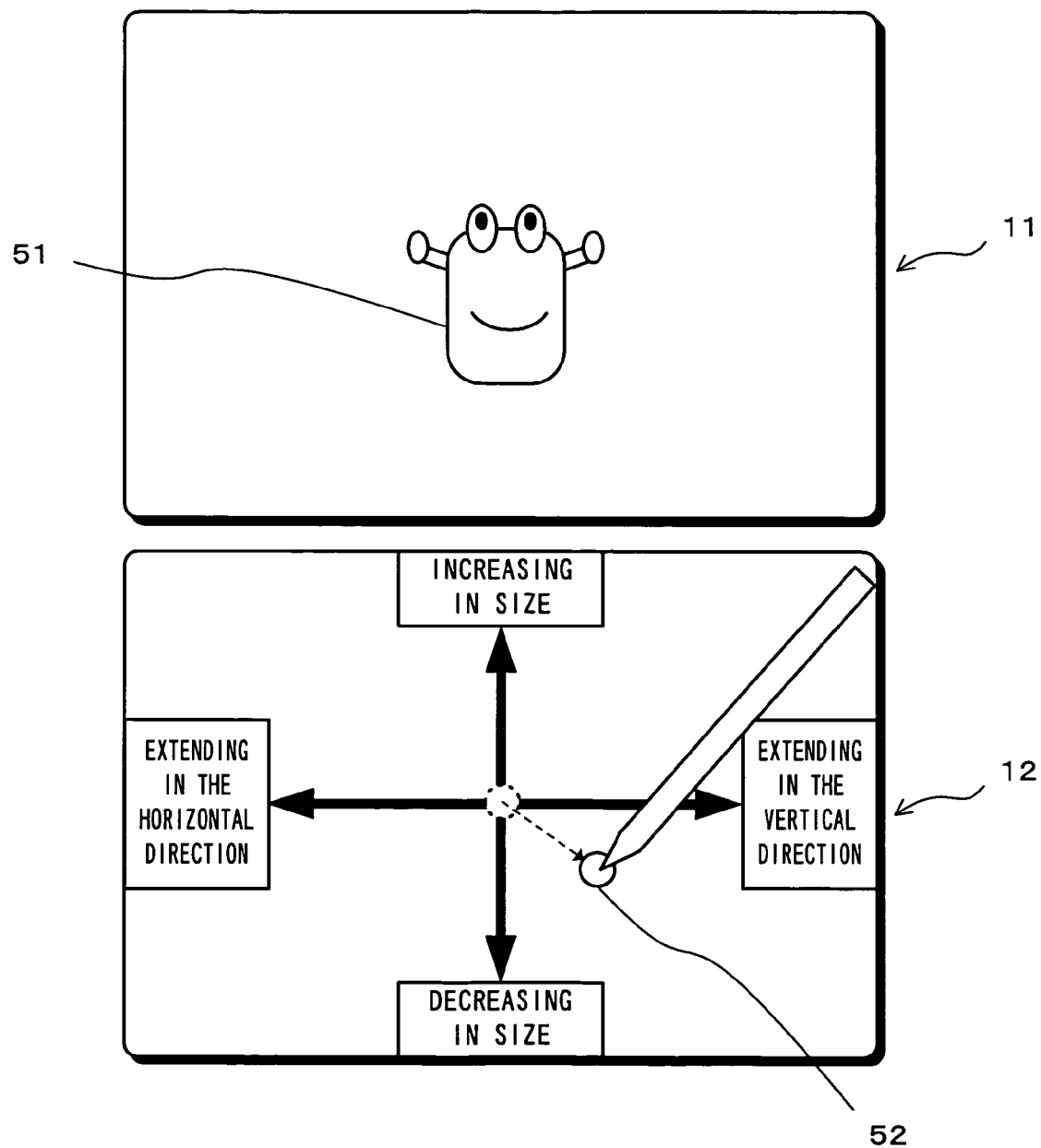
FIG. 12 shows an example of the display state of the LCD 11 and the LCD 12 after the marker is moved.

After the area is distinguished, the CPU core 31 advances to step S19 and creates an image in which the display state of the operation target object 51 on the LCD 11 has been changed in accordance with the value of the row number X (one of X1 through X7) and the value of the column number Y (one of Y1 through Y7) which are set for the distinguished area. In step S20, the CPU core 31 updates the display state of the LCD 11 and the LCD 12. The processing in steps S19 and S20 will be described more specifically with reference to FIG. 11 and FIG. 12. FIG. 11 shows an example of the display state of the LCD 11 and the LCD 12 before the marker 52 is moved. FIG. 12 shows an example of the display state of the LCD 11 and the LCD 12 after the marker 52 is moved. In FIG. 11, the operation target object 51 is displayed on the LCD 11 with the standard size (×1). The marker 52 is displayed at the center of the LCD 12 (the area D4 in FIG. 10). It is assumed that, for example, the marker 52 is moved from the area D4 to the area E5. For moving the marker 52 in this manner, the CPU core 31 first refers to the area information stored in the area information storage area 23. The area information (see FIG. 10) sets the parameters of the row number X5 and the column number Y5 associated with the area E5 to which the marker 52 is to be moved. Next, the CPU core 31 refers to the parameter tables 54 and 55 stored in the parameter data storage area 24. The parameter table 54 sets the value of 0.8 in the column number Y5 as the magnification ratio of the size of the operation target object 51. The parameter table 55 sets, in the row number X5, the value of 1.2 as the magnification ratio of the length of the operation target object 51 in the vertical direction and the value of 0.8 as the magnification ratio of the length of the operation target object 51 in the horizontal direction. Based on the column number Y5, the CPU core 31 creates, through calculations, an image of the operation target object 51 having a size of 0.8 times the standard size. Based on the row number X5, the CPU core 31 creates, through calculations, an image of the operation target object 51 having lengths of 1.2 times (in the vertical direction)×0.8 times (in the horizontal direction) the standard lengths. As a result, the CPU core 31 draws the object target object 51 having a size of 0.8 times, a length in the vertical direction of 1.2 times and a length in the horizontal direction of 0.8 times the standard size and lengths on the LCD 11. At the same time, the CPU core 31 draws the marker 52 at the coordinate position corresponding to the coordinate value stored in the marker coordinate value storage area 25 in step S17 (i.e., the post-movement coordinate position).

After the display state is updated in step S20, the CPU core 31 determines whether or not a predetermined condition for terminating the game is fulfilled (for example, whether or not the number of mistakes permitted for the player has reached a predetermined value) (step S24). When the predetermined condition for terminating the game is not fulfilled (NO in step S24), the CPU core 31 returns to step S14 and repeats the operations in steps S14 through S23 until the predetermined condition for terminating the game is fulfilled. When the predetermined condition for terminating the game is fulfilled (YES in step S24), the CPU core 31 performs predetermined over-over processing (for example, selects whether or not to continue the game), and terminates the game. Thus, the image display processing in this embodiment is finished.

Figure 13:
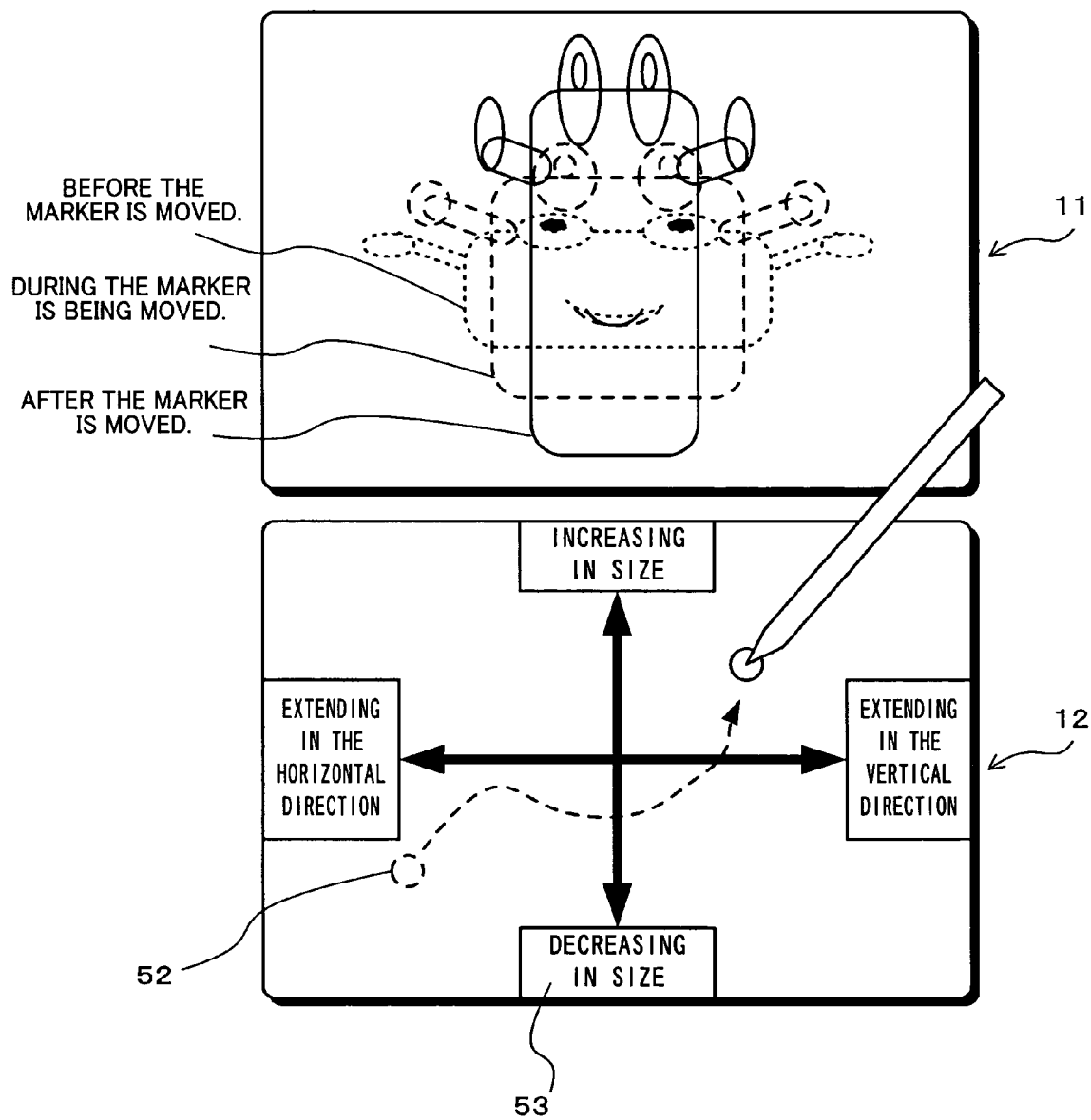
FIG. 13 shows an example of a change of the display state of the LCD 11 and the LCD 12 by the movement of the marker.

By the above-described processing, a step-by-step and continuous change of the operation target object 51 can be displayed. For example, FIG. 13 shows an example of the change of the display state of the LCD 11 and the LCD 12 when the marker 52 is moved from the area F2 via the areas E3, E4 and D5 to the area C5. In FIG. 13, the pre-movement position of the marker 52 is the area F2, and the operation target object 51 is displayed with the size of 0.6 times the standard size. The marker 52 is moved from the area F2 via the areas E3, D4 and D5 to the area C6. In accordance with the movement of the marker 52, the size of the operation target object 51 is changed step by step and continuously from 0.6 times to 0.8 times to 1.0 time to 1.2 times the standard size, based on the parameter associated with each of the areas through which the marker 52 passes. The lengths of the operation target object 51 in the vertical and horizontal directions are also changed step by step and continuously from 0.6 times (vertical)×1.4 times (horizontal) to 0.8 times (vertical)×1.2 times (horizontal) to 1.0 time (vertical)×1.0 time (horizontal) to 1.2 times (vertical)×0.8 times (horizontal) to 1.4 times (vertical)×0.6 times (horizontal) with respect to the standard lengths. In this manner, an image which is longer in the horizontal direction is changed to an image which is longer in the vertical direction. Finally, the operation target object 51 is displayed in the state of being changed to have a size of 1.2 times, a length in the vertical direction of 1.4 times and a length in the horizontal direction of 0.6 times with respect to the standard size and lengths. Unlike the case where the operation target object 51 is changed suddenly from the size of 0.6 times to 1.2 times the standard size, a continuous change can be displayed. Thus, the player can be provided with a feeling of operating the operation target object 51 in an analog-like manner such that even a subtle change in the operation of the marker 52 can effectively change the display state.

By displaying the parameter changing guide 53 on the LCD 12, the correspondence between the input position on the touch panel 16 and the change in the display state of the operation target object 51 can be presented to the player. Thus, the information on how the operation target object 51 is changed in accordance with the movement of the marker 52 can be presented to the player in an easy-to-understand manner.

Figure 14:
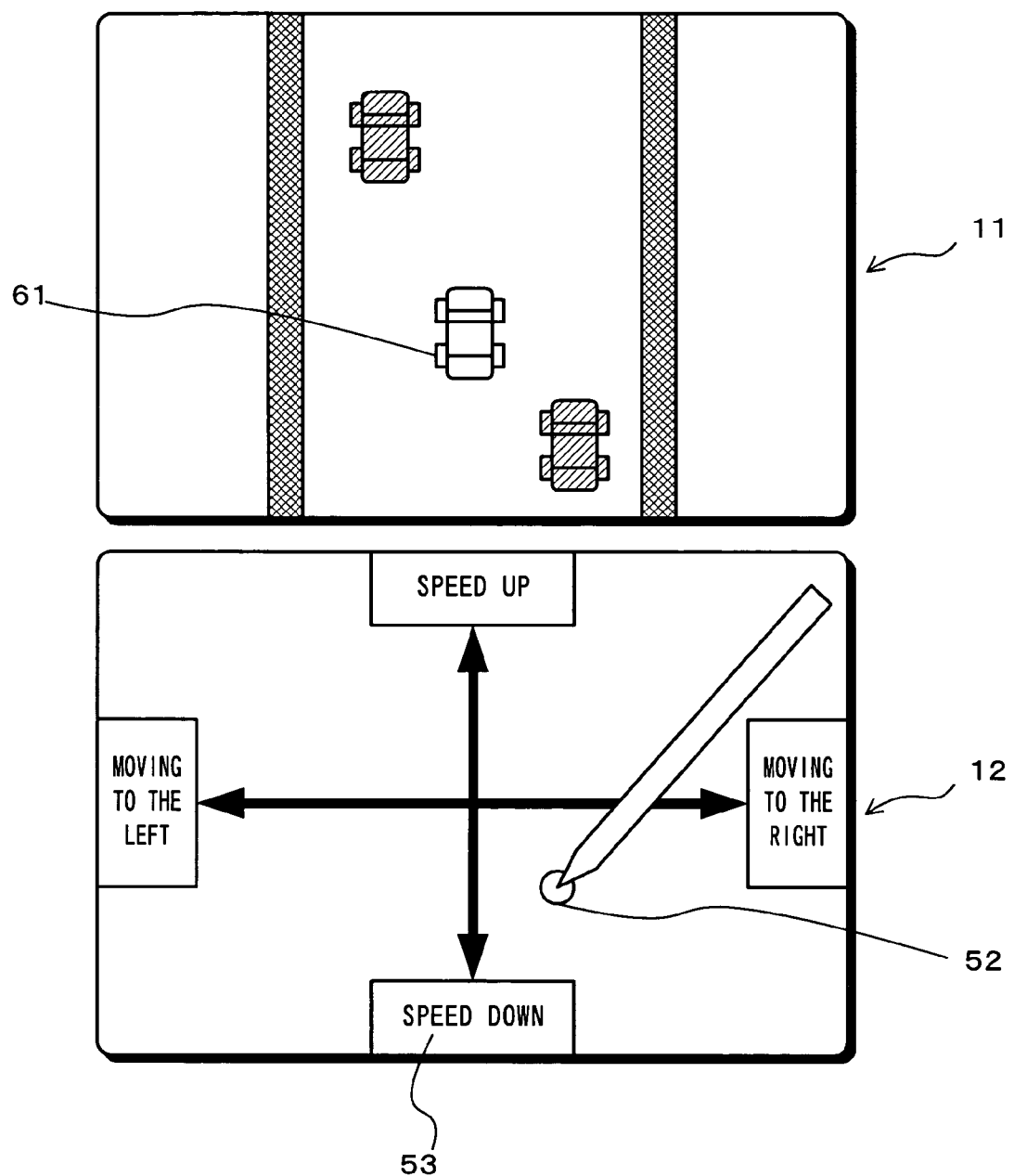
FIG. 14 shows an example of a game screen when an example embodiment of the present invention is applied to a racing game.

One example embodiment of the present invention is applicable to, for example, an operation of an automobile in a racing game. FIG. 14 shows an example of a game screen when one example embodiment of the present invention is applied to a racing game. FIG. 15 shows an example of the parameter tables 54 and 55 when an example embodiment of the present invention is applied to the racing game. In FIG. 14, a player's automobile object 61 is displayed at the center of the LCD 11. The marker 52 and the parameter changing guide 53 are displayed on the LCD 12. In FIG. 15, the parameters changing step by step are set such that the values of row number X correspond to the horizontal direction of the LCD 12 and the values of column number Y correspond to the vertical direction of the LCD 12. In FIG. 14, when the marker 52 is moved in the horizontal direction, the display position of the player's automobile object 61 is changed to the right or left of the screen in accordance with the movement of the marker 52. In accordance with the movement of the marker 52 in the vertical direction, the speed of the player's automobile object 61 (more accurately, the speed of scrolling the screen of the LCD 11) is changed. By such processing, the player, when operating the marker 52, can be provided with a feeling of handling the player's automobile object 61 to the right and left and changing the speed (accelerating) in an analog-like manner.

Figure 16:
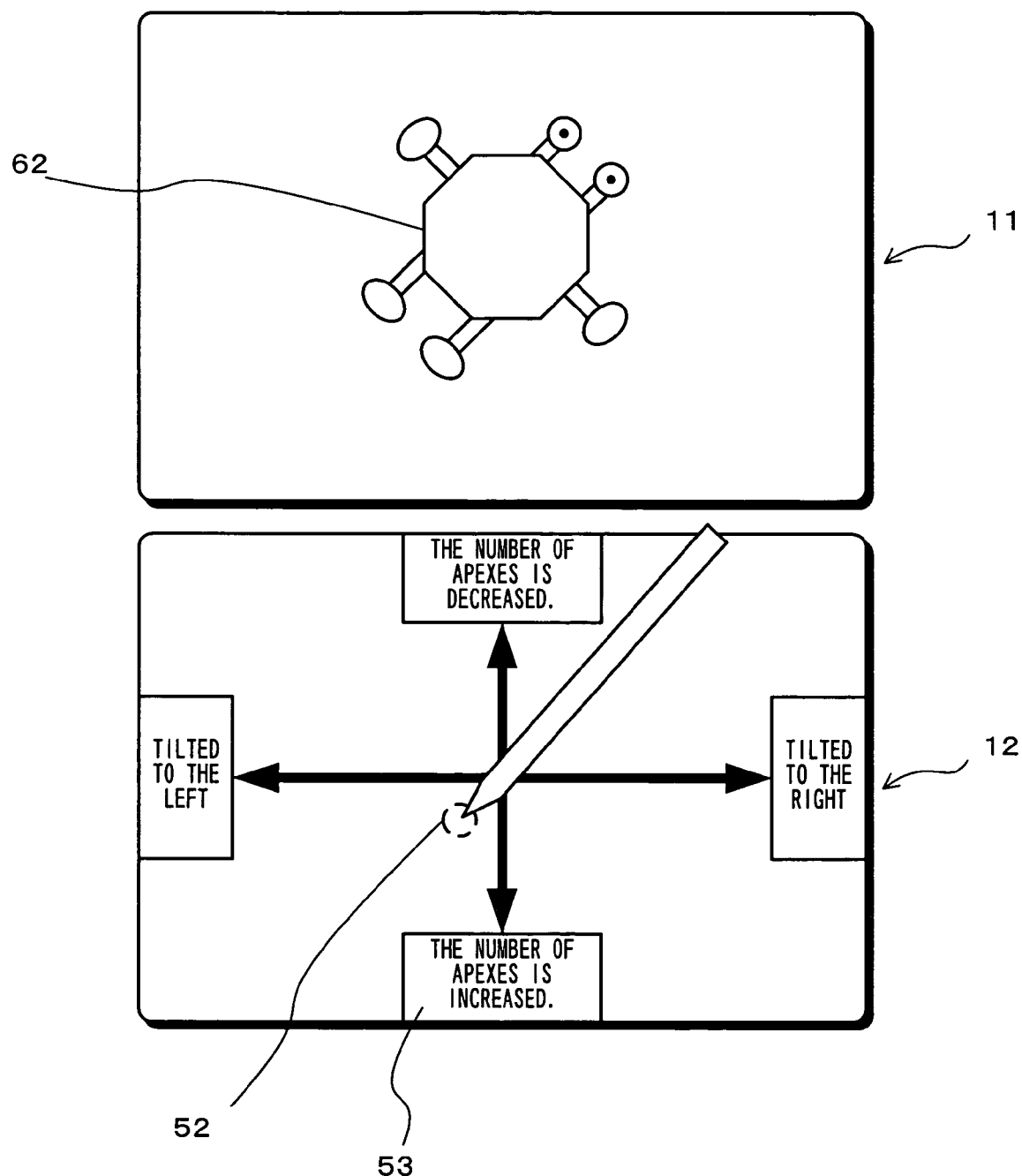
FIG. 16 shows an example of the display state of the LCD 11 and the LCD 12 when a plurality of images are prepared in advance.
Figure 17:
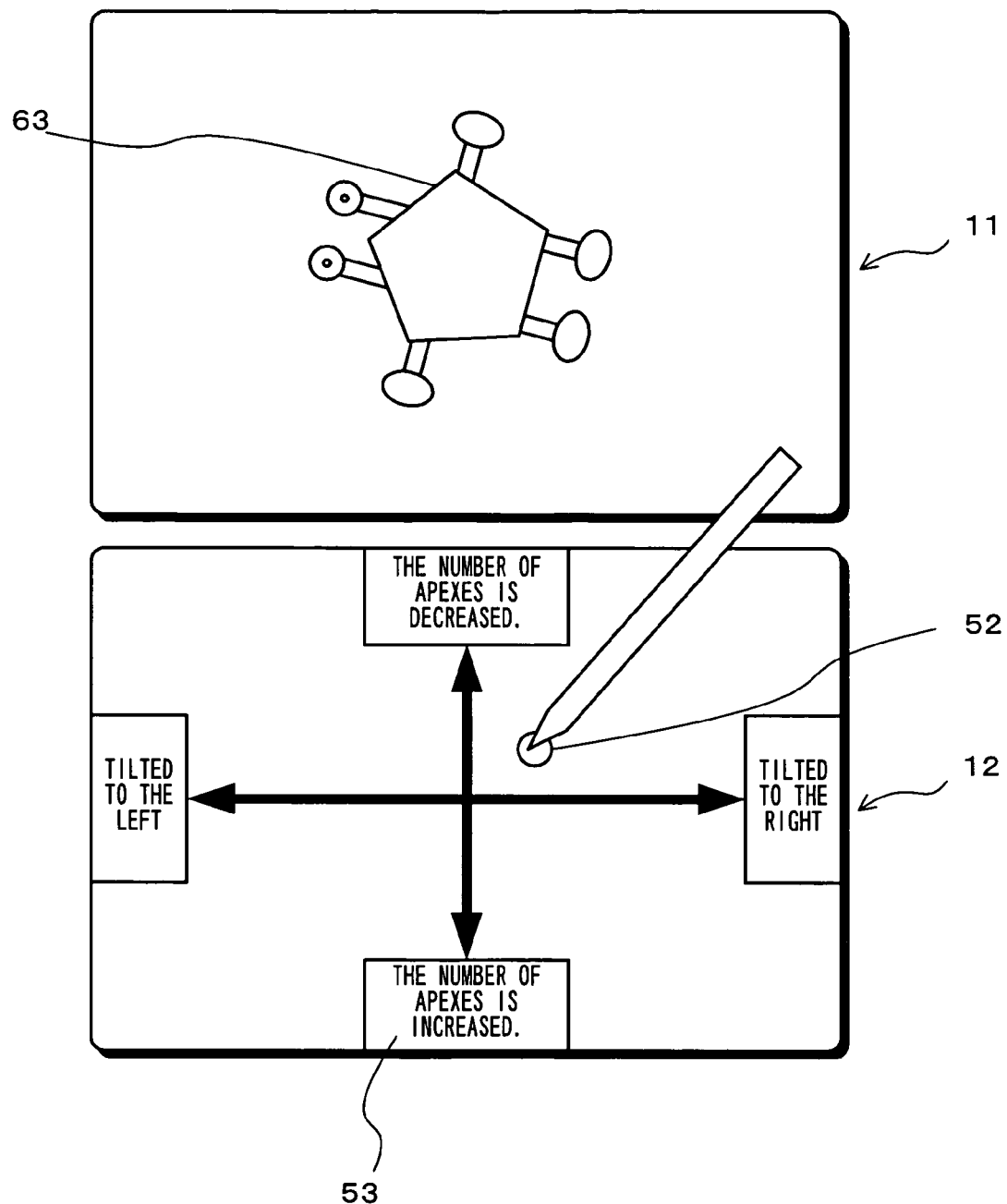
FIG. 17 shows an example of the display state of the LCD 11 and the LCD 12 when a plurality of images are prepared in advance.

In this embodiment, the parameter tables 54 and 55 are used to designate the magnification ratio of the size of the operation target object 51 and the like and create, through calculations, an image in which the size and the like of the operation target object 51 have been changed based on the magnification ratio. Alternatively, a plurality of images of the operation target object 51 may be prepared in advance to be directly associated with the divided areas of the LCD 12. FIG. 16 and FIG. 17 show an example of a change in the display state of the LCD 11 and the LCD 12 when a plurality of images are prepared in advance. For example, an octagonal image 62 shown in FIG. 16 and a pentagonal image 63 shown in FIG. 17 are prepared in the ROM 180 in advance and are read to the image data storage area 22 of the RAM 37. By the processing in step S11 described above, the area E3 and the image 62 are associated with each other, and the area C5 and the image 63 are associated with each other. When the area E3 is pressed, the image 62 is displayed on the LCD 11 as shown in FIG. 16; and when the area C5 is pressed, the image 63 is displayed on the LCD 11 as shown in FIG. 17. In this manner, an image corresponding to the pressed area may be directly read and displayed without using the parameter tables or the like. Still alternatively, the CPU core 31 may distinguish the area based on the input coordinate position on the LCD 12 which has been pressed by the player, without displaying the marker 52.

(Second Embodiment)

Figure 18:
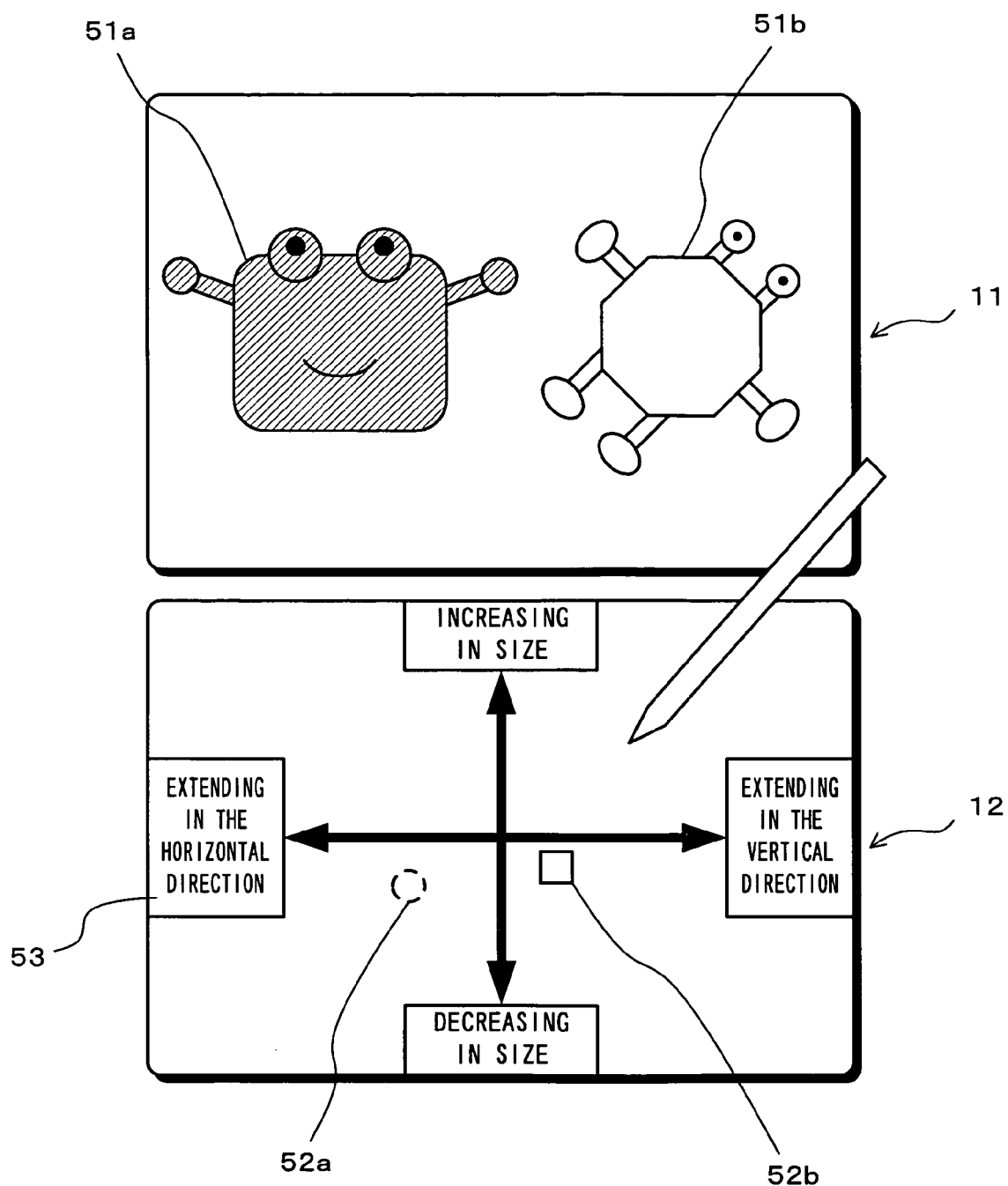
FIG. 18 shows an example of the LCD 11 and the LCD 12 displaying two operation target objects and two markers according to a second example embodiment of the present invention.
Figure 19:
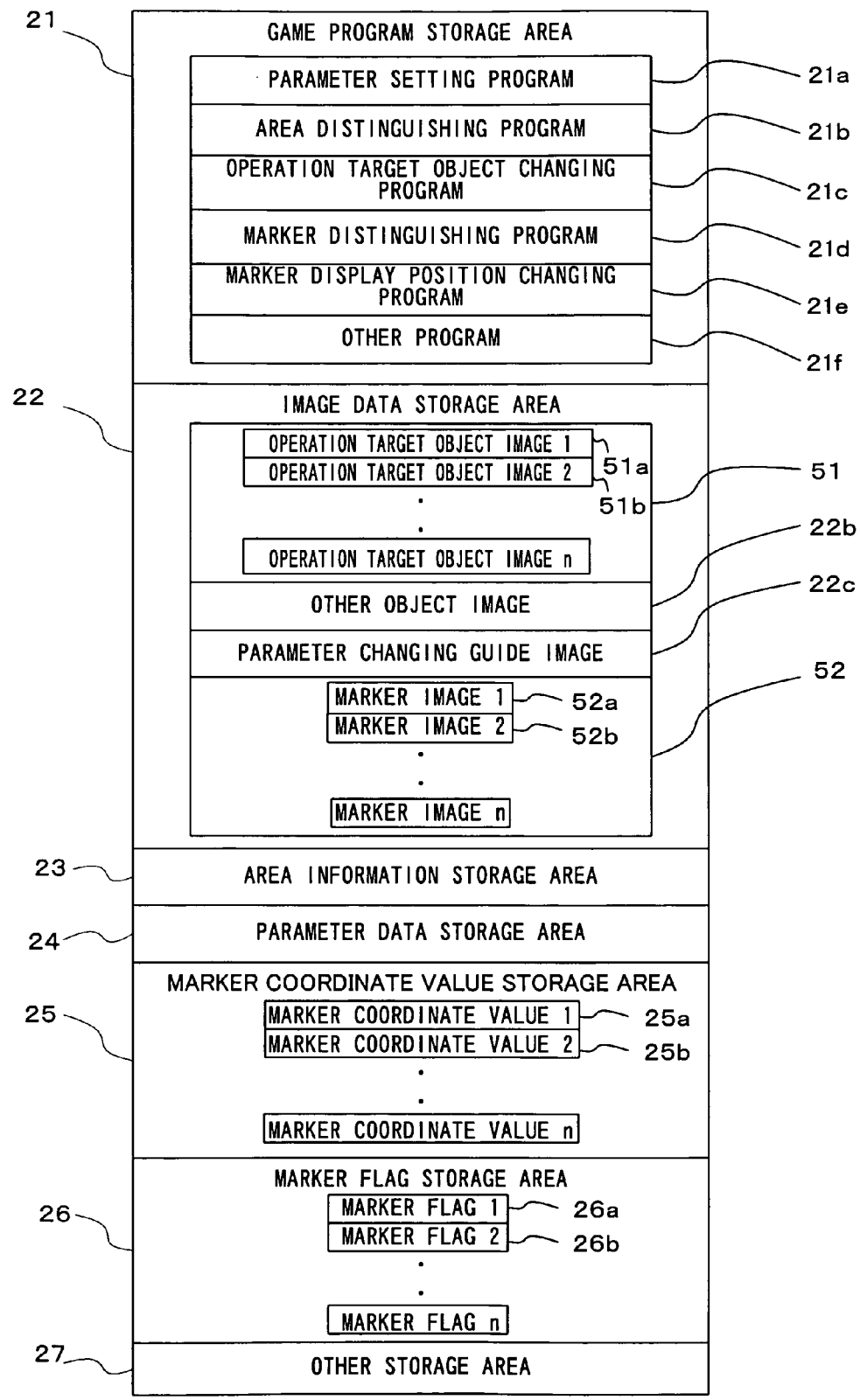
FIG. 19 is a memory map graphically illustrating a memory space of the RAM 37 according to the second example embodiment of the present invention.

With reference to FIG. 18 through FIG. 22, a second example embodiment of the present invention will be described. In the first embodiment, one operation target object is displayed on the LCD 11. In the second embodiment, as shown in FIG. 18, two operation target objects 51a and 51b are displayed on the LCD 11. On the LCD 12, two markers 52a and 52b corresponding to the respective operation target objects 51a and 51b are displayed. FIG. 19 is a memory map graphically illustrating a memory space of the RAM 37 in the second embodiment. In FIG. 19, a plurality of operation target object images 51, a plurality of marker images 52, a plurality of marker coordinate values 25, and a plurality marker flags 26 are prepared. Except for these points, the memory space of the RAM 37 basically has the same structure as that of the first embodiment. The mobile game apparatus 10 in the second embodiment is substantially the same as that of the first embodiment. Identical elements as those shown in FIG. 1 and FIG. 2 bear identical reference numerals thereto and detailed descriptions thereof will be omitted.

Figure 20:
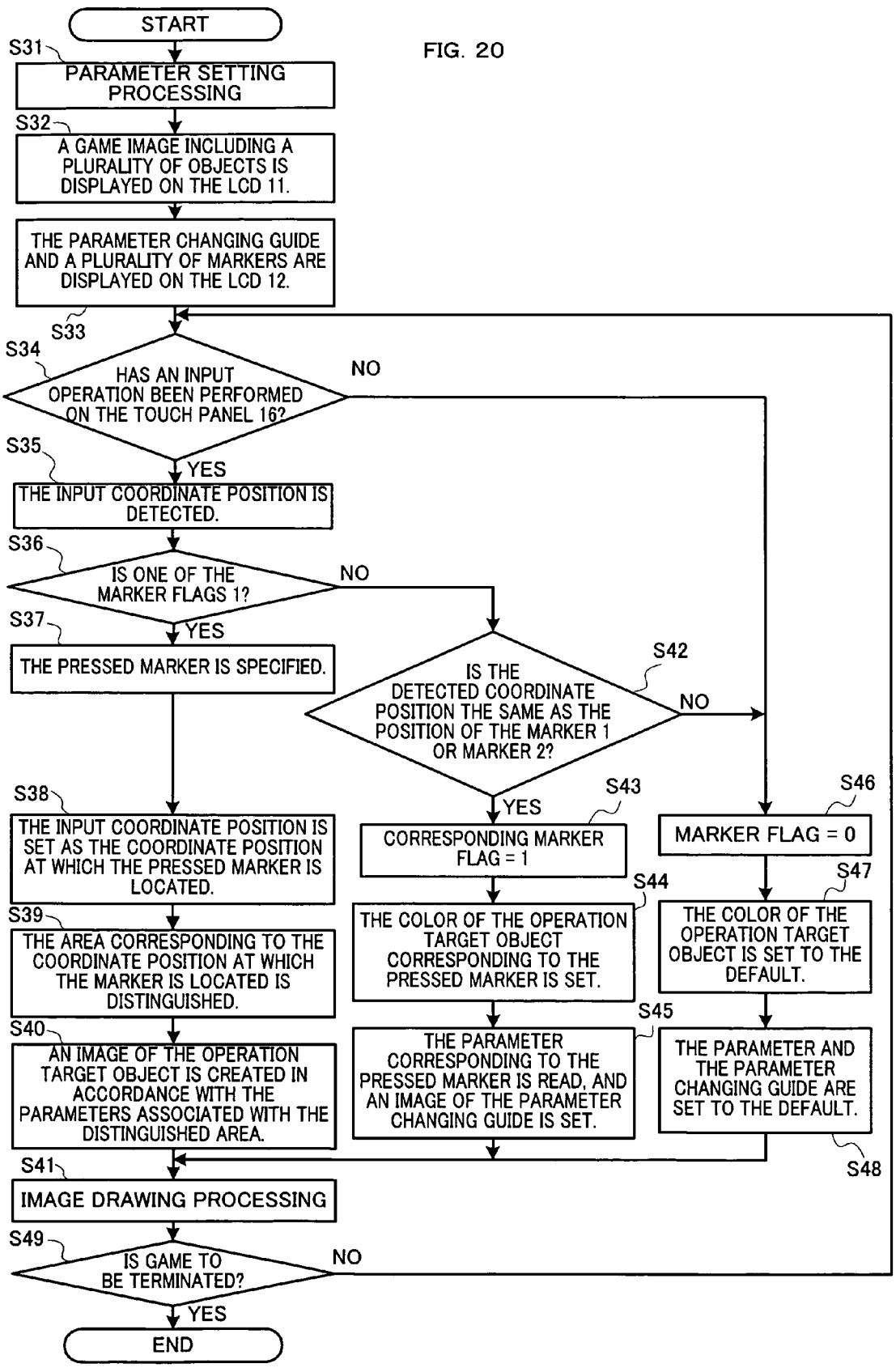
FIG. 20 is a flowchart of a main routine illustrating an overall operation of the mobile game apparatus 10 according to the second example embodiment of the present invention.

FIG. 20 is a flowchart illustrating a main routine, which shows an overall operation of the mobile game apparatus 10 in the second embodiment. Hereinafter, with reference to FIG. 20, the operation of the mobile game apparatus 10 in this embodiment will be described.

First in step S31, parameter setting processing for starting a game is performed. The parameter setting processing in step S31 will be described more specifically. First, the CPU core 31 reads area dividing information from the ROM 180 like in the first embodiment. Next, the CPU core 31 reads the parameter tables 54 and 55, which set parameters on a change of the display state of the operation target object 51a, from the ROM 180 and stores the parameter tables 54 and 55 in the parameter data storage area 24. Then, the CPU core 31 divides the LCD 12 into a plurality of areas based on the area dividing information. The CPU core 31 then sets the values of the row number X (X1 through X7) of the parameter table 55 and the values of the column number Y (Y1 through Y7) of the parameter table 54 in association with the respective areas of the LCD 12. The CPU core 31 then stores the information on the association of the divided areas and the parameters in the area information storage area 23. The CPU core 31 further associates the marker 52a with the operation target object 51a, and associates the marker 52b with the operation target object 51b. Namely, the CPU core 31 associates the markers and the operation target objects such that when the marker 52a is operated, the display state of the operation target object 51a is changed, whereas when the marker 52b is operated, the display state of the operation target object 51b is changed. The CPU core 31 stores a predetermined coordinate value representing an initial display position of the marker 52a as the marker coordinate value 25a. Similarly, the CPU core 31 stores a predetermined coordinate value representing an initial display position of the marker 52b as the marker coordinate value 25b. The CPU core 31 also sets a marker flag 26a representing the pressing state of the marker 52a and a marker flag 26b representing the pressing state of the marker 52b to be 0. Thus, the parameter setting processing in step S31 is finished. In this embodiment, the LCD 12 is divided into 7×7 areas as shown in FIG. 10 like in the first embodiment. (Therefore, the areas will also be labeled as, for example, "the area A1" like in the first embodiment.)

Next in step S32, image drawing processing on the LCD 11 is performed. More specifically, the operation target object 51a, the operation target object 51b, and other objects (for example, a background image) are read from the RAM 37 (more accurately, from the image data storage area 22) and displayed on the LCD 11.

Next in step S33, image drawing processing on the LCD 12 is performed. This will be described more specifically. The CPU core 31 displays a parameter changing guide 53a for the object target object 51a. Then, the CPU core 31 displays the marker 52a at the coordinate position corresponding to the coordinate value stored as the marker coordinate value 25a, and also displays the marker 52b at the coordinate position corresponding to the coordinate value stored as the marker coordinate value 25b. Thus, the image drawing processing on the LCD 12 is finished. As a result of the image drawing processing in steps S32 and S33, the operation target objects 51a and 51b are displayed on the LCD 11 and the parameter changing guide 53a and the markers 52a and 52a are displayed on the LCD 12 as shown in FIG. 18.

Next in step S34, the CPU core 31 determines whether or not an input operation has been performed on the touch panel 16. When it is determined that there has been no input operation performed on the touch panel 16 (NO in step S34), the CPU core 31 sets the marker flags 26a and 26b to be 0 (step S46). Then, in step S47, the CPU core 31 sets the colors of the operation target objects 51a and 51b to the color designated as the default. In step S48, the CPU core 31 reads the parameter tables 54 and 55 for the operation target object 51a and stores the parameter tables 54 and 55 in the parameter data storage area 24. The CPU core 31 also sets the parameter changing guide 53 for the operation target object 51a in the parameter changing guide image 22c. Then, the CPU core 31 updates the display state of the LCD 11 and the LCD 12 (step S48). As a result, the operation target objects 51a and 51b are displayed in the color designated as the default on the LCD 11, and the parameter changing guide 53a for the operation target object 51a and the markers 52a and 52b are displayed on the LCD 12. Then, the CPU core 31 determines whether or not to terminate the game (step S49).

By contrast, when it is determined that there has been an input operation performed on the touch panel 16 (YES in step S34), the CPU core 31 performs detection processing of the input coordinate position (step S35). In step S35, the CPU core 31 detects the coordinate value on the touch panel 16 of the LCD 12 which has been input. Next in step S36, the CPU core 31 determines whether one of the marker flags 26a and 26b is 1 or not. When it is determined that one of the marker flags 26a and 26b is 1 in step S36 (which means that either the marker 52a or 52b is pressed) (YES in step S36), the CPU core 31 specifies which one of the markers 52a and 52b is pressed (step S37). Specifically, when the marker flag 26a is 1, the marker 52a is specified to be pressed, whereas when the marker flag 26b is 1, the marker 52b is specified to be pressed.

Next in step S38, the CPU core 31 sets the display position of the marker 52a or 52b which was specified in step S37 at the position represented by the coordinate value detected in step S35. Next in step S39, the CPU core 31 distinguishes the area on the LCD 12 corresponding to the display position of the marker 52a or 52b specified in step S37 (i.e., the position pressed by the player). Next in step S40, the CPU core 31 creates an image in which the display state of the operation target object 51a or 51b associated with the marker 52a or 52b specified in step S37 has been changed in accordance with the parameter set for the area distinguished in step S39. The CPU core 31 then updates the display state so as to display the created image (step S41). Then, the CPU core 31 determines whether or not to terminate the game in step S49.

By contrast, when neither the marker flag 26a nor the marker flag 26b is 1 in step S36 (NO in step S36), the CPU core 31 determines whether the coordinate value detected in step S35 is the same as the value stored as one of the marker coordinate values 25a and 26b (i.e., whether the player has pressed one of the markers 52a and 52b) (step S42). When it is determined that the coordinate value detected in step S35 is different from the values stored as the marker coordinate values 25a and 26b (which means that the player has pressed a position on the touch panel 16 other than the markers 52a and 52b) (NO in step S42), the CPU core 31 performs the same processing as that performed when it is determined NO in step S34 (when there has been no input performed on the touch panel 16) (steps S46 through S49).

By contrast, when it is determined that the coordinate value detected in step S35 is the same as the value stored as either the marker coordinate value 25a or 26b (which means that the player has pressed either the marker 52a or 52b) (YES in step S42), the CPU core 31 specifies whether the coordinate value detected in step S35 is the same as the value stored as the marker coordinate value 25a or 26b and sets the corresponding marker flag to be 1 (step S43). Specifically, when the coordinate value detected in step S35 is the same as the value stored as the marker coordinate value 25a, the marker flag 26a is set to be 1, whereas when the coordinate value detected in step S35 is the same as the value stored as the marker coordinate value 25b, the marker flag 26b is set to be 1. Next, the CPU core 31 designates a predetermined color as the color of the operation target object associated with the marker specified in step S43 (step S44). The predetermined color is set in advance as the color representing the current operation target object. For the operation target object which is not associated with the specified marker, the color designated as the default is set. In step S45, the CPU core 31 reads parameter tables corresponding to the specified marker from the ROM 180, and stores the parameter tables in the parameter data storage area 24. At the same time, the CPU core 31 reads the parameter changing guide 53 for the operation target object associated with the specified marker from the RAM 37 or the ROM 180. In step S41, the CPU core 31 updates the display state of the LCD 11 and the LCD 12. As a result, either the operation target object 51a or 51b is displayed on the LCD 11 in the color representing the current operation target object, and the other operation target object is displayed in the default color. At the same time, the parameter changing guide 53 for the operation target object associated with the specified marker is displayed on the LCD 12. After this, the CPU core 31 determines whether or not to terminate the game in step S49.

Figure 21:
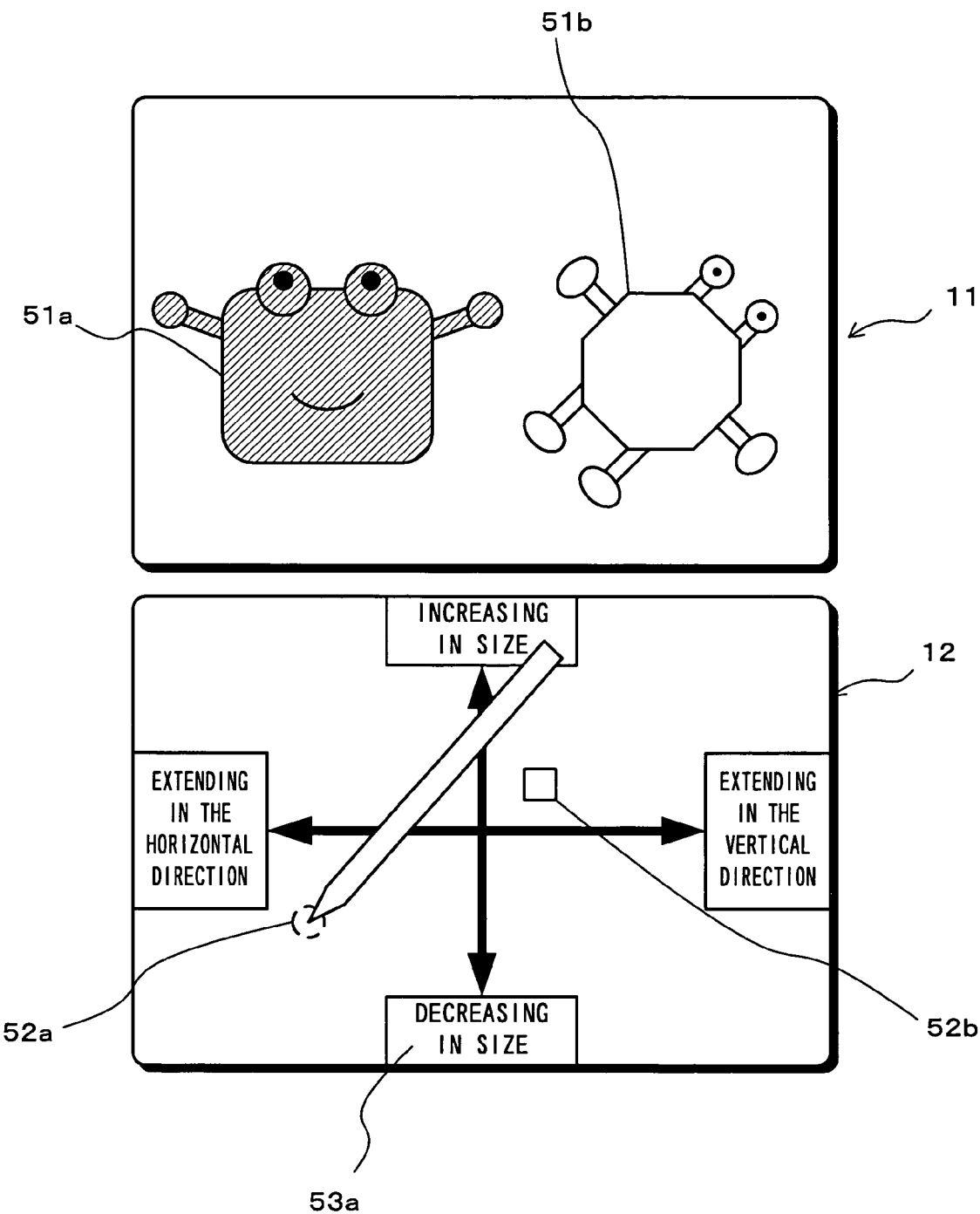

FIG. 21 and FIG. 22 show an example of a change of the display state of the LCD 11 and the LCD 12 when the marker 52b is pressed in the state where the parameter changing guide 53a for the operation target object 51a is displayed on the LCD 12. In FIG. 21, the operation target object 51a is displayed in the predetermined color representing the current operation target object on the LCD 11. On the LCD 12, the parameter changing guide 53a for the operation target object 51a (a guide regarding a change in the size or length) and the markers 52a and 52b are displayed. When the marker 52b is pressed in this state, the color of the operation target object 51b is changed to the predetermined color, whereas the color of the operation target object 51a is changed to the default color (step S44). Then, parameter tables (not shown) corresponding to the marker 52b are read from the ROM 180 and stored in the parameter data storage area 24. The image of the parameter changing guide 53a for the operation target object 51a displayed on the LCD 12 is switched to an image of a parameter changing guide 53b for the operation target object 51b (a guide regarding a change in the number of apexes and tilting) (step S45). As a result, as shown in FIG. 22, the operation target object 51b is displayed on the LCD 11 in the color representing the current operation target object, and the parameter changing guide 53b for the operation target object 51b is displayed on the LCD 12.

In step S49, the CPU core 31 determines whether or not a predetermined condition for terminating the game is fulfilled. When the predetermined condition for terminating the game is not fulfilled (NO in step S49), the CPU core 31 returns to step S34 and repeats the operations in steps S34 through S49 until the predetermined condition for terminating the game is fulfilled. When the predetermined condition for terminating the game is fulfilled (YES in step S49), the CPU core 31 performs predetermined over-over processing (for example, selects whether or not to continue the game), and terminates the game. Thus, the image display processing in this embodiment is finished.

By allowing the image of the parameter changing guide to be changed in accordance with the pressed marker as described above, different parameters can be set for a plurality of objects provided as operation targets.

While example embodiments of the invention has been described in detail, the foregoing description is in all aspects illustrative and not restrictive. It is understood that numerous other modifications and variations can be devised without departing from the scope of the invention.

What is claimed is:

1. An image processing apparatus, comprising:
   a touch panel for detecting operation information which indicates an operation performed by the player on a 2D plane of the touch panel;
   area information setting programmed logic circuitry for dividing the touch panel into a plurality of areas and setting different area information for each of the plurality of areas regarding a display form of an object;
   marker display position storage area for storing a display position of a marker for representing one of the plurality of areas;
   at least one display provided in relation with the touch panel for displaying an image of an entirety of the object operable by the player and the marker;
   marker distinguishing programmed logic circuitry for comparing coordinate data obtained from the operation information with a coordinate value of the display position of the marker and thus distinguishing whether or not the player indicates the marker;
   marker display position changing programmed logic circuitry for, when it is distinguished by the marker distinguishing programmed logic circuitry that the player indicates the marker, changing the display position of the marker in accordance with a change in the operation information based on a single user input operation performed on the 2D plane of the touch panel;
   area distinguishing programmed logic circuitry for distinguishing an area corresponding to the display position of the marker based on the display position;
   object changing programmed logic circuitry for, when the display position of the marker is changed by the marker display position changing programmed logic circuitry based on the single user input operation performed on the 2D plane of the touch panel, changing the display form on the object, including a shape of the object, based on the area information which is set for the area corresponding to the display position of the marker and distinguished by the area distinguishing programmed logic circuitry;

the area information setting programmed logic circuitry divides the 2D plane of the touch panel into first areas along a first direction and divides the touch panel into second areas along a second direction perpendicular to the first direction, and sets a first parameter, which changes step by step along the first direction, and which indicates the display form of the object, and a second parameter, which changes step by step along the second direction, which is different from the first parameter, and which indicates the display form of the object, for each of the plurality of areas as the area information; and the object changing programmed logic circuitry changes the display form of the object, including the shape of the object, based on the first parameter and the second parameter simultaneously changing their respective values as the marker display position changes in a direction other than the first direction and the second direction based on the single user input operation performed on the 2D plane of the touch panel, the first and second parameters being set for the distinguished area so that the image of the entirety of the object to be deformed by at least the change in shape of the object is displayed on the display.

2. The image processing apparatus according to claim 1, wherein:

the at least one display includes a first display and a second display located separate from each other;

the image including the object is displayed on the first display;

an image indicating a content of the area information which is set for each of the plurality of areas and the marker are displayed on the second display; and the touch panel is provided in relation with the second display.

3. The image processing apparatus according to claim 1, further comprising object image storage area for storing an object image associated with each of the plurality of areas as the area information;

wherein the object changing programmed logic circuitry reads the object image associated with the distinguished area from the object image storage area and displays the object image on the at least one display.

4. The image processing apparatus according to claim 1, further comprising a parameter changing guide programmed logic circuitry for generating a parameter changing guide, for display on the at least one display, to indicate to the player how the shape of the object is to be changed through the changed display position of the marker along at least one of the first and second directions, wherein the parameter changing guide includes a first guideline extending in the first direction and a second guideline extending in the second direction, the first and second guidelines intersecting with each other at a center of the displayed image.

5. The image processing apparatus according to claim 1, wherein the first parameter is size of the object and the second parameter is length of the object.

6. The image processing apparatus according to claim 1, wherein the first parameter is number of apexes of the object and the second parameter is direction of tilt of the object.

7. The image processing apparatus according to claim 1, wherein the display form of the object, including the shape of the object, is changed based on the first parameter and the second parameter which are set for the area distinguished by the area distinguishing programmed logic circuitry when the display position of the marker is changed, with respect to the center of the displayed image, in the direction other than the first direction and the second direction.

8. The image processing apparatus, comprising:

a touch panel for detecting operation information which indicates an operation performed by the player on a 2D plane of the touch panel;

area information setting programmed logic circuitry for dividing the touch panel into a plurality of areas and setting different area information for each of the plurality of areas regarding a display form of an object;

marker display position storage area for storing a display position of a marker for representing one of the plurality of areas;

at least one display provided in relation with the touch panel for displaying an image of an entirety of the object operable by the player and the marker;

marker distinguishing programmed logic circuitry for comparing coordinate data obtained from the operation information with a coordinate value of the display position of the marker and thus distinguishing whether or not the player indicates the marker;

marker display position changing programmed logic circuitry for, when it is distinguished by the marker distinguishing programmed logic circuitry that the player indicates the marker, changing the display position of the marker in accordance with a change in the operation information based on a single user input operation performed on the 2D plane of the touch panel;

area distinguishing programmed logic circuitry for distinguishing an area corresponding to the display position of the marker based on the display position; and object changing programmed logic circuitry for, when the display position of the marker is changed by the marker display position changing programmed logic circuitry based on the single user operation performed on the 2D plane of the touch panel, changing the display form of the object, including a shape of the object based on the area information which is set for the area corresponding to the display position of the marker and distinguished by the area distinguishing programmed logic circuitry; wherein the at least one display displays a plurality of markers and a plurality of objects respectively associated with the plurality of markers on a one to one basis;

the marker distinguishing programmed logic circuitry specifies which one of the plurality of markers is indicated based on the operation information and the coordinate values of the display positions of the markers; and the object changing programmed logic circuitry changes, for each one of the plurality of markers, the display form of the object, including the shape of the object associated with the marker specified by the marker distinguishing programmed logic circuitry so that the display form of the object, including the shape of the object is changed based (i) a first parameter which indicates the display form of the object and which is set for the area distinguished by the area distinguishing programmed logic circuitry when the display position of the marker is changed, with respect to the center of the displayed image, along a first direction, and (ii) a second parameter which indicates the display form of the object and which is set for the area distinguished by the area distinguishing programmed logic circuitry when the display position of the marker is changed, with respect to the center of the displayed image, along a second direction which is different than the first direction, the first parameter and the second parameter simultaneously changing their respective values as the specified marker display position changes in a direction other than the first direction and the second direction based on the single user input operation performed on the 2D plane of the touch panel, so that the image of the entirety of the object to be deformed by at least the change in shape of the object is displayed on the display.

9. The image processing apparatus according to claim 8, wherein the object changing programmed logic circuitry changes at least the shape of the object associated with the marker specified by the marker distinguishing programmed logic circuitry, and changes an image indicating a content of the area information.

10. The image processing apparatus according to claim 8, wherein the display form of the object, including the shape of the object, is changed based on the first parameter and the second parameter which are set for the area distinguished by the area distinguishing programmed logic circuitry when the display position of the marker is changed, with respect to the center of the displayed image, in the direction other than the first direction and the second direction.

11. An image processing apparatus, comprising:
a first display for displaying an image of an entirety of an object operable by the player;
a second display;
a touch panel provided in relation with the second display for detecting operation information on a 2D plane of the touch panel;
area information setting programmed logic circuitry for dividing the 2D plane of the touch panel into a plurality of areas and setting different area information for each of the plurality of areas;
area distinguishing programmed logic circuitry for distinguishing an area indicated by the player on the operation information detected by an operation on the touch panel by the player; and
object changing programmed logic circuitry for changing a display form of the object, including a shape of the object based on the area information, which is set for the area distinguished by the area distinguishing programmed logic circuitry, based on a single user input operation performed on the 2D plane of the touch panel;
wherein the second display displays an image indicating a content of the area information which is set for each of the plurality of areas; wherein
the area information setting programmed logic circuitry divides the touch panel into first areas along a first direction and divides the touch panel into second areas along a second direction perpendicular to the first direction, and sets a first parameter, which changes step by step along the first direction, and which indicates the display form of the object, and a second parameter, which changes step by step along the second direction and being different from the first parameter, and which indicates the display form of the object, for each of the plurality of areas as the area information; and
the object changing programmed logic circuitry changes the display form of the object, including the shape of the object, based on the first parameter and the second parameter simultaneously changing their respective values based on the single user input operation performed on the 2D plane of the touch panel in a direction other than the first direction and the second direction, the first and second parameters being set for the distinguished area so that the image of the entirety of the object to be deformed at least by the change in shape of the object is displayed on the first display.

12. The image processing apparatus according to claim 11, further comprising a parameter changing guide programmed logic circuitry for generating a parameter changing guide, for display on the at least one display, to indicate to the player how the shape of the object is to be changed through the changed display position of the marker along at least one of the first and second directions.

13. The image processing apparatus according to claim 11, wherein the first parameter is size of the object and the second parameter is length of the object.

14. The image processing apparatus according to claim 11, wherein the first parameter is number of apexes of the object and the second parameter is direction of tilt of the object.

15. The image processing apparatus according to claim 11, wherein the display form of the object, including the shape of the object, is changed based on the first parameter and the second parameter which are set for distinguished area distinguished by the area distinguishing programmed logic circuitry based on the single user input operation performed on the 2D plane of the touch panel in a direction other than the first direction and the second direction with respect to the center of the displayed image.

16. A non-transitory storage medium storing an image processing program for causing a computer system, including one or more processors, of an image processing apparatus, including a touch panel for detecting operation information which indicates an operation performed by the player on a 2D plane of the touch panel and a display section provided in relation with the touch panel for displaying an image of an entirety of an object operable by the player, to execute processing by causing the computer system of the apparatus to perform at least:
dividing the touch panel into a plurality of areas and setting different area information for each of the plurality of areas regarding a display form of the object;
storing a display position of a marker for representing one of the plurality of areas;
distinguishing an area indicated by the player and an area corresponding to the display position of the marker based on the operation information;
distinguishing whether or not the player indicates the marker based on the operation information and the display position of the marker;
when it is distinguished that the player indicates the marker, changing the display position of the marker in accordance with a change in the operation information based on a single user input operation performed on the 2D plane of the touch panel;
generating a display of the image and the marker for the display section;
when the display position of the marker is changed in accordance with a change in the operation information based on the single user input operation performed on the 2D plane of the touch panel, changing the display form of the object, including a shape of the object based on the area information which is set for the area corresponding to the display position of the marker; wherein
the touch panel is divided into first areas along a first direction and into second areas along a second direction perpendicular to the first direction, and a first parameter, which changes step by step along the first direction, and which indicates the display form of the object, and a second parameter, which changes step by step along the second direction which is different from the first parameter, and which indicates the display form of the object, are set for each of the plurality of areas as the area information; and the display form of object, including the shape of the object, is changed based on the first parameter and the second parameter simultaneously changing their respective values as the marker display position changes in a direction other than the first direction and the second direction based on the single user input operation performed on the 2D plane of the touch panel, the first and second parameters being set for the distinguished area so that the image of the entirety of the object to be deformed by at least the change in shape of the object is displayed on the display section.

17. A non-transitory storage medium according to claim 16, wherein:

the display section includes a first display section and a second display section;

the image including the object is displayed on the first display section, and an image indicating a content of the area information which is set for each of the plurality of areas and the marker is displayed on the second display section; and the touch panel is provided in relation with the second display section.

18. A non-transitory storage medium according to claim 16, wherein:

processing by the computer system causes the apparatus to further perform storing an object image associated with each of the plurality of areas as the area information; and the object image associated with the distinguished area is read from the object image storage area and the object image is displayed on the display section.

19. A non-transitory storage medium according to claim 16, wherein:

a plurality of markers and a plurality of objects respectively associated with the plurality of markers is displayed on the display section;

which specified one of the plurality of markers is indicated; and at least the shape of the object associated with the specified marker is changed.

20. A non-transitory storage medium according to claim 19, wherein the state of the object associated with the specified marker is changed, and an image indicating a content of the area information is changed.

21. The non-transitory storage medium according to claim 16, wherein the image processing program causes the computer system of the image processing apparatus to execute processing by causing the computer system of the apparatus to further function as a parameter changing guide programmed logic circuitry for generating a parameter changing guide, for display on the display section, to indicate to the player how the shape of the object is to be changed through the changed display position of the marker along at least one of the first and second directions, wherein the parameter changing guide includes a first guideline extending in the first direction and a second guideline extending in the second direction, the first and second guidelines intersecting with each other at a center of the displayed image.

22. The non-transitory storage medium according to claim 16, wherein the first parameter is size of the object and the second parameter is length of the object.

23. The non-transitory storage medium according to claim 16, wherein the first parameter is number of apexes of the object and the second parameter is direction of tilt of the object.

24. The non-transitory storage medium according to claim 16, wherein the display form of the object, including the shape of the object, is changed based on the first parameter and the second parameter which are set for the distinguished area when the display position of the marker is changed, with respect to the center of the displayed image, in the direction other than the first direction and the second direction.

25. A non-transitory storage medium storing an image processing program for causing a computer system, including one or more processors, of an image processing apparatus, including a first display for displaying an image of an entirety of an object operable by the player, a second display, and a touch panel provided in relation with the second display for detecting operation information on a 2D plane of the touch panel, to execute processing by causing the computer system of the apparatus to perform at least:

dividing the 2D plane of the touch panel into a plurality of areas and setting different area information for each of the plurality of areas;

distinguishing an area indicated by the player based on the operation information detected by an operation on the touch panel by the player based on a single user input operation performed on the 2D plane of the touch panel;

changing a display form of the object, including a shape of the object, based on the area information which is set for the distinguished area based on the single user input operation performed on the 2D plane of the touch panel;

wherein the second display displays an image indicating a content of the area information which is set for each of the plurality of areas;

the touch panel is divided into first areas along a first direction and divides the touch panel into second areas along a second direction perpendicular to the first direction, and sets a first parameter, which changes step by step along the first direction, and which changes the display form the object and a second parameter, which changes step by step along the second direction and being different from the first parameter, and which indicates the display form of the object, for each of the plurality of areas as the area information; and the display form of the object including the shape of the object, is changed based on the first parameter and the second parameter simultaneously changing their respective values based on the single user input operation performed on the 2D plane of the touch panel in a direction other than the first direction and the second direction, the first and second parameters being set for the distinguished area so that the image of the entirety of the object to be deformed by at least the change in shape of the object is displayed on the first display.

26. The non-transitory storage medium according to claim 25, further wherein the image processing program causes the computer system of the image processing apparatus to execute processing by causing the computer system of the apparatus to further function as a parameter changing guide programmed logic circuitry for generating a parameter changing guide, for display on the second display, to indicate to the player how the shape of the object is to be changed through the changed display position of the marker along at least one of the first and second directions.

27. The non-transitory storage medium according to claim 25, wherein the first parameter is size of the object and the second parameter is length of the object.

28. The non-transitory storage medium apparatus according to claim 25, wherein the first parameter is number of apexes of the object and the second parameter is direction of tilt of the object.

29. The non-transitory storage medium according to claim 25, wherein the display form of the object, including the shape of the object, is changed based on the first parameter and the second parameter which are set for the distinguished area when the display position of the marker is changed based on the single user input operation performed on the 2D plane of the touch panel in the direction other than the first direction and the second direction with respect to the center of the displayed image, in a direction other than the first direction and the second direction.

* * * * *